(12) United States Patent
Nattermann et al.

(10) Patent No.: US 11,609,363 B2
(45) Date of Patent: Mar. 21, 2023

(54) LAYERED OPTICAL COMPOSITE HAVING A REDUCED CONTENT OF HIGHLY REFRACTIVE LAYERS AND ITS APPLICATION IN AUGMENTED REALITY

(71) Applicant: SCHOTT AG, Mainz (DE)

(72) Inventors: Kurt Nattermann, Ockenheim (DE); Jens Ulrich Thomas, Stralsund (DE); Frank-Thomas Lentes, Bingen (DE); Thorsten Damm, Eltville am Rhein (DE); Peter Naß, Mainz (DE)

(73) Assignee: SCHOTT AG, Mainz (DE)

( * ) Notice: Subject to any disclaimer, the term of this patent is extended or adjusted under 35 U.S.C. 154(b) by 138 days.

(21) Appl. No.: 17/034,595

(22) Filed: Sep. 28, 2020

(65) Prior Publication Data
US 2021/0149090 A1    May 20, 2021

(30) Foreign Application Priority Data

Sep. 27, 2019    (EP) .................................... 19200293

(51) Int. Cl.
G02B 5/00    (2006.01)
G02B 27/01    (2006.01)
(Continued)

(52) U.S. Cl.
CPC .............. *G02B 5/003* (2013.01); *G02B 1/115* (2013.01); *G02B 27/0172* (2013.01);
(Continued)

(58) Field of Classification Search
CPC .... G02B 5/003; G02B 1/115; G02B 27/0172; G02B 2027/0178; G02B 1/113; G06F 3/011; G06F 3/0202
See application file for complete search history.

(56) References Cited

U.S. PATENT DOCUMENTS 3,934,961 A    1/1976    Itoh
6,066,401 A    5/2000    Stilburn
(Continued)

FOREIGN PATENT DOCUMENTS

CN    101512389    8/2009
CN    101512390    8/2009
(Continued)

OTHER PUBLICATIONS

ASTM F534-02.
(Continued)

*Primary Examiner* — Mihir K Rayan
(74) *Attorney, Agent, or Firm* — Ruggiero McAllister & McMahon LLC

(57) ABSTRACT

The present disclosure relates to a layered optical composite, in particular for use in an augmented reality device. In particular, the disclosure relates to a layered optical composite and a process for its preparation, a device comprising the layered optical composite and a process for its preparation, and the use of a layered optical composite in an augmented reality device.

The present disclosure relates to a layered optical composite comprising:
a. a substrate having a front face and a back face,
b. a coating comprising:
  i. a type T layer, and
  ii. a type C region comprising one or more type C layers;
in which the substrate has:
  i. a thickness $t_G$ in the range from 0.2 to 1.2 mm;
  ii. a refractive index $n_G$ at a wavelength $\lambda$ in the range from 1.6 to 2.4; and
  iii. an optical absorption coefficient $K_G$ at the wavelength $\lambda$ of less than 10 cm$^{-1}$;
(Continued)

in which the type C layers individually and independently have:
  i. a thickness $t_C$ in the range from 9 to 250 nm;
  ii. a refractive index $n_C$ at the wavelength $\lambda$ in the range from 1.35 to 2.43; and
  iii. an optical absorption coefficient $K_C$ at the wavelength $\lambda$ of less than $10^6$ cm$^{-1}$;
in which at least one type C layer has:
  i. an optical absorption coefficient at the wavelength $\lambda$ of at least 100 cm$^{-1}$;
in which the type T layer has:
  i. a thickness $t_T$ in the range from 50 to 300 nm;
  ii. a refractive index $n_T$ at the wavelength $\lambda$ in the range from 1.35 to 1.96; and
  iii. an optical absorption coefficient $K_T$ of less than 80 cm$^{-1}$;
in which the type C region and the type T layer are each superimposed over one face of the substrate with the type C region further than the type T layer from the substrate;
in which $\lambda$ is in the range from 430 to 670 nm.

18 Claims, 16 Drawing Sheets

(51) Int. Cl.
  *G02B 1/115* (2015.01)
  *G06F 3/01* (2006.01)
  *G06F 3/02* (2006.01)
(52) U.S. Cl.
  CPC ...... *G02B 2027/0178* (2013.01); *G06F 3/011* (2013.01); *G06F 3/0202* (2013.01)

(56) References Cited

U.S. PATENT DOCUMENTS

| | | |
|---|---|---|
| 2007/0008624 A1 | 1/2007 | Hirayama |
| 2007/0070859 A1 | 3/2007 | Hirayama |
| 2008/0278823 A1 | 11/2008 | Peuchert |
| 2012/0075705 A1 | 3/2012 | Beinat |
| 2013/0201562 A1* | 8/2013 | Kawagishi ............. G02B 1/115 359/601 |
| 2013/0279007 A1* | 10/2013 | Kawai .................... G02B 1/115 359/586 |
| 2014/0016201 A1 | 1/2014 | Lee |
| 2015/0235370 A1 | 8/2015 | Abovitz |
| 2015/0322270 A1 | 11/2015 | Amin |
| 2015/0355382 A1 | 12/2015 | Henn |
| 2016/0023156 A1 | 1/2016 | Castellanet |
| 2016/0231568 A1 | 8/2016 | Saarikko |
| 2016/0277718 A1 | 9/2016 | Teramoto |
| 2017/0212348 A1 | 7/2017 | Fu |
| 2017/0235142 A1 | 8/2017 | Wall |
| 2017/0363870 A1 | 12/2017 | Cakmakci |
| 2018/0025968 A1 | 1/2018 | Liu |
| 2018/0029337 A1 | 2/2018 | Wilson |
| 2018/0095284 A1 | 4/2018 | Welch |
| 2018/0127310 A1 | 5/2018 | Keech |
| 2018/0141851 A1* | 5/2018 | Amma ................ C03C 3/062 |
| 2018/0259682 A1 | 9/2018 | Scherschlicht |
| 2018/0313981 A1 | 11/2018 | Cobb |
| 2020/0041698 A1 | 2/2020 | Damm |
| 2020/0041794 A1 | 2/2020 | Damm |
| 2020/0041804 A1 | 2/2020 | Thomas |
| 2020/0123044 A1 | 4/2020 | Amma |
| 2020/0192095 A1 | 6/2020 | Puetz |
| 2020/0209434 A1 | 7/2020 | Nakano |
| 2020/0346973 A1* | 11/2020 | Akao .................... C03C 3/19 |
| 2021/0341738 A1 | 11/2021 | Dong |
| 2022/0177362 A1* | 6/2022 | Damm ................ C03C 17/3411 |

FOREIGN PATENT DOCUMENTS

| | | |
|---|---|---|
| CN | 101858994 | 10/2010 |
| CN | 104977632 | 10/2015 |
| CN | 106537219 | 3/2017 |
| CN | 107305264 | 10/2017 |
| CN | 107966821 | 4/2018 |
| CN | 110794584 | 2/2020 |
| CN | 110806608 | 2/2020 |
| CN | 110850511 | 2/2020 |
| DE | 102007022048 | 11/2008 |
| EP | 2657011 | 10/2013 |
| WO | 2008000841 | 1/2008 |
| WO | 2016075596 | 5/2016 |
| WO | 2016110339 | 7/2016 |
| WO | 2017157807 | 9/2017 |
| WO | 2017176861 | 10/2017 |
| WO | 2019151321 | 8/2019 |

OTHER PUBLICATIONS

ASTM F657-92 (As reapproved in 1999).
King, "Experimental and Theoretical Results in Two-Layer Low Reflecting Coatings for Glass", Journal of the Optical Society of America, vol. 36., No. 9, Sep. 1946, pp. 513-517.

* cited by examiner

LAYERED OPTICAL COMPOSITE HAVING A REDUCED CONTENT OF HIGHLY REFRACTIVE LAYERS AND ITS APPLICATION IN AUGMENTED REALITY

CROSS REFERENCE TO RELATED APPLICATIONS

The present application claims the benefit of European Patent Application No. 19200293.9, filed on Sep. 27, 2019, which is herein incorporated by reference.

BACKGROUND OF THE DISCLOSURE

1. Field of the Disclosure

In general, the present disclosure relates to a layered optical composite, in particular for use in an augmented reality device or a virtual reality device. In particular, the disclosure relates to a layered is optical composite and a process for its preparation, a device comprising the layered optical composite and a process for its preparation, and the use of a layered optical composite in an augmented reality device.

2. Discussion of the Related Art

Augmented reality and virtual reality constitute a high activity technological area serving a range of use areas, such as entertainment, medical, educational, preferably a homogeneous refractive construction and transport, to name just a few examples. By contrast to the related area of virtual reality, in which a virtual world is entirely generated, augmented reality centres on a close integration of multimedia information with real world sensory input, typically by selectively overlaying a digital image onto a spectacle window. Technical challenges arise from the simultaneous requirements of a good real-world image, a good overlaid image along with good wearability. One approach to an augmented reality device is presented in International patent application number 2017/176861A1. That document teaches a system in which an overlaid image is coupled into a wearable screen and propagated in a transverse direction. A requirement still exists for improved devices for augmented reality and virtual reality.

SUMMARY OF THE DISCLOSURE

It is an object to overcome at least one of the challenges encountered in the state of the art in relation to augmented reality devices or virtual reality devices.

It is an object of the present disclosure to improve low-angle transmissivity in an optical body.

It is an object of the present disclosure to improve high-angle reflectivity in an optical body.

It is an object of the present disclosure to increase field of view in an augmented reality device.

DETAILED DESCRIPTION OF THE DISCLOSURE

Figure 1:
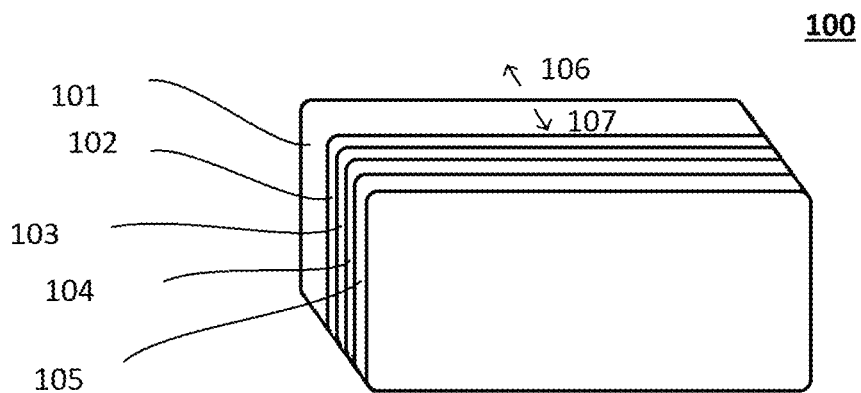
FIG. 1 shows a layered optical composite according to the present disclosure having a substrate, a t type layer and 3 c type coating layers.

A contribution is made to at least partially overcoming at least one of the above mentioned objects by the embodiments of the present disclosure. In the following, the $X^{th}$ embodiment number is denoted as |X|.

|1| A layered optical composite comprising:
  a. a substrate having a front face and a back face,
  b. a coating comprising:
     i. a type T layer, and
     ii. a type C region comprising one or more type C layers;
  wherein the substrate has:
     i. a thickness $t_G$ in the range from 0.2 to 1.2 mm, preferably in the range from 0.25 to 0.9 mm, more preferably in the range from 0.3 to 0.5 mm;
     ii. a refractive index $n_G$ at a wavelength $\lambda$ in the range from 1.6 to 2.4, preferably in the range from 1.7 to 2.3, more preferably in the range from 1.8 to 2.2; and
     iii. an optical absorption coefficient $K_G$ at the wavelength $\lambda$ of less than 10 cm$^{-1}$, preferably less than 5 cm$^{-1}$, more preferably less than 2 cm$^{-1}$;
  wherein the type C layers individually and independently have:
     iv. a thickness $t_C$ in the range from 9 to 250 nm, preferably in the range from 12 to 150 nm, more preferably in the range from 15 to 100 nm;
     v. a refractive index $n_C$ at the wavelength $\lambda$ in the range from 1.35 to 2.43, preferably in the range from 1.4 to 2.35, more preferably in the range from 1.45 to 2.3; and
     vi. an optical absorption coefficient $K_C$ at the wavelength $\lambda$ of less than 10$^6$ cm$^{-1}$, preferably less than 10$^5$ cm$^{-1}$, more preferably less than 10$^4$ cm$^{-1}$;
  wherein at least one type C layer has:
     vii. an optical absorption coefficient at the wavelength $\lambda$ of at least 100 cm$^{-1}$, preferably at least 200 cm$^{-1}$, more preferably at least 300 cm$^{-1}$;
  wherein the type T layer has:
     viii. a thickness $t_T$ in the range from 50 to 300 nm, preferably in the range from 70 to 280 nm, more preferably in the range from 90 to 250 nm;
     ix. a refractive index $n_T$ at the wavelength $\lambda$ in the range from 1.35 to 1.96, preferably in the range from 1.4 to 1.9, more preferably in the range from 1.45 to 1.85; and x. an optical absorption coefficient $K_T$ of less than 80 cm$^{-1}$, preferably less than 50 cm$^{-1}$ more preferably less than 20 cm$^{-1}$;

wherein the type C region and the type T layer are each superimposed over one face of the substrate with the type C region further than the type T layer from the substrate;

wherein λ is in the range from 430 to 670 nm.

In one aspect of this embodiment, the C-type region comprises one or more layers having a thickness of less than 9 nm.

In one aspect of this embodiment, the coating comprises the T-type layer and the C-type region only.

In one aspect of this embodiment, the T-type layer directly follows the substrate.

In one aspect of this embodiment, no layer having a thickness of 9 nm or more is present between the substrate and the T-type layer.

In one aspect of this embodiment, no layer having an absorption coefficient of above 80 cm$^{-1}$, preferably no layer having an absorption coefficient of above 50 cm$^{-1}$, preferably no layer having an absorption coefficient of above 20 cm$^{-1}$, is present between the substrate and the T-type layer.

In one aspect of this embodiment, no layer having a thickness of 9 nm or more and an absorption coefficient of above 80 cm$^{-1}$, preferably no layer having a thickness of 9 nm or more and an absorption coefficient of above 50 cm$^{-1}$, preferably no layer having a thickness of 9 nm or more and an absorption coefficient of above 20 cm$^{-1}$, is present between the substrate and the T-type layer.

In one aspect of this embodiment, the first C-type layer following the T-type layer has an optical absorption coefficient at the wavelength λ of at least 100 cm$^{-1}$, preferably at least 200 cm$^{-1}$, more preferably at least 300 cm$^{-1}$.

In one aspect of this embodiment, the refractive index of the substrate is in the range from 1.6 to 2.4, preferably in the range from 1.7 to 2.3, more preferably in the range from 1.8 to 2.2 for all wavelengths in the range from 430 to 670 nm.

In one aspect of this embodiment, the optical absorption coefficient of the substrate is less than 10 cm$^{-1}$, preferably less than 5 cm$^{-1}$, more preferably less than 2 cm$^{-1}$ for all wavelengths in the range from 430 to 670 nm.

In one aspect of this embodiment, the type C layers have a refractive index in the range from 1.35 to 2.43, preferably in the range from 1.4 to 2.35, more preferably in the range from 1.45 to 2.3 for all wavelengths in the range from 430 to 670 nm.

In one aspect of this embodiment, the type C layers have an optical absorption coefficient of less than 10$^6$ cm$^{-1}$, preferably less than 10$^5$ cm$^{-1}$, more preferably less than 10$^4$ cm$^{-1}$ for all wavelengths in the range from 430 to 670 nm.

In one aspect of this embodiment, at least one type C layer has an optical absorption coefficient of at least 100 cm$^{-1}$, preferably at least 200 cm$^{-1}$, more preferably at least 300 cm$^{-1}$, for all wavelengths in the range from 430 to 670 nm.

In one aspect of this embodiment, the refractive index of the T type layer is in the range from 1.35 to 1.96, preferably in the range from 1.4 to 1.9, more preferably in the range from 1.45 to 1.85 for all wavelengths in the range from 430 to 670 nm.

In one aspect of this embodiment, the optical absorption coefficient of the T type layer is less than 80 cm$^{-1}$, preferably less than 50 cm' more preferably less than 20 cm' for all wavelengths in the range from 430 to 670 nm.

|2| The layered optical composite according to any of the preceding embodiments, wherein the thickness of the type T layer $t_T$ layer satisfies one or both of the following criteria, preferably both:

a.
$$t_T \geq 0.35 \frac{\lambda}{n_T}, \text{ preferably } t_T \geq 0.40 \frac{\lambda}{n_T};$$

and b.
$$t_T \leq 0.65 \cdot \frac{\lambda}{n_T}, \text{ preferably } t_T \leq 0.60 \cdot \frac{\lambda}{n_T}.$$

|3| The layered optical composite according to any of the preceding embodiments, wherein the refractive index of the type T layer $n_T$ is less than the refractive of the substrate $n_G$.

|4| The layered optical composite according to any of the preceding embodiments, wherein the C-type region has two or more type C layers.

|5| The layered optical composite according to embodiment |4|, wherein one or both of the following criteria are satisfied, preferably both:
 a. $n_t \geq (n_G - 0.03)/1.4$, preferably $n_t \geq (n_G + 0.05)/1.4$; and
 b. $n_t \leq (n_G + 0.39)/1.4$, preferably $n_t \leq (n_G + 0.31)/1.4$.

|6| The layered optical composite according to embodiment |4| or |5|, wherein the layered optical composite has an optical transmissivity at the wavelength λ of at least 90% for light incident normal to its front face.

In one aspect of this embodiment, the criterion holds for all wavelengths in the range from 430 to 670 nm.

|7| The layered optical composite according to any of the embodiments |1| to |3|, wherein the coating has a single type C layer.

|8| The layered optical composite according to embodiment 171, wherein the type C layer has a refractive index $n_C$ and one or more of the following criteria are satisfied, preferably all 3:
 a. $n_C < n_T$;
 b. $n_T \geq n_G - 0.11$, preferably $n_T \geq n_G - 0.09$; and
 c. $n_T \leq n_G - 0.03$, preferably $n_T \leq n_G - 0.04$.

In the various aspects of this embodiment, the following feature combinations are satisfied: a., b., c., a.+b., a.+c., b.+c., or a.+b.+c.

|9| The layered optical composite according to embodiments |7| or |8|, wherein one or both of the following criteria are satisfied, preferably both:
 a. $|\sqrt{n_T n_E} - n_C| \leq 0.11$; and
 b.
$$\left| \frac{\lambda}{4n_C} - t_C \right| \leq \frac{\lambda}{50}.$$

|10| The layered optical composite according to any of the preceding embodiments, wherein one or more of the following is satisfied:
 i.) A radius of curvature of the substrate greater than 600 mm, preferably greater than 800 mm, more preferably greater than 1100 mm;
 ii.) A in-plane optical loss of the substrate measured perpendicular to the front face of at most 20%, preferably at most 15%, more preferably at most 10%;

iii.) A surface roughness of the substrate of less than 5 nm, preferably less than 3 nm, more preferably less than 2 nm;
iv.) A surface roughness of the coating of less than 5 nm, preferably less than 3 nm, more preferably less than 2 nm;
v.) Total thickness variation of the substrate of less than 5 μm, preferably less than 4 μm, more preferably less than 3 μm, more preferably less than 2 μm.
vi.) A min-max local thickness variation over 75% of the front face of less than 5 μm preferably less than 4 μm, more preferably less than 3 μm, more preferably less than 2 μm.
vii.) A warp of the optical layered composite of less than 350 μm, preferably warp of less than 300 μm, more preferably a warp of less than 250 μm
viii.) A bow of the optical layered composite of less than 300 μm, preferably bow of less than 250 μm, more preferably a bow of less than 200 μm.

In some aspects of this embodiment, the following combinations of features are satisfied:

i.), ii.), i.)+ii.), i.)+iii.), ii.)+iii.), i.)+ii.)+iii.), iv.), i.)+iv.), ii.)+iv.), i.)+ii.)+iv.), iii.)+iv.), i.)+iii.)+iv.), ii.)+iii.)+iv.), i.)+ii.)+iii.)+iv.), v.), i.)+v.), ii.)+v.), i.)+ii.)+v.), iii.)+v.), i.)+iii.)+v.), ii.)+iii.)+v.), i.)+ii.)+iii.)+v.), iv.)+v.), i.)+iv.)+v.), ii.)+iv.)+v.), i.)+ii.)+iv.)+v.), iii.)+iv.)+v.), i.)+iii.)+iv.)+v.), ii.)+iii.)+iv.)+v.), i.)+ii.)+iii.)+iv.)+v.), vi.), i.)+vi.), ii.)+vi.), i.)+ii.)+vi.), iii.)+vi.), i.)+iii.)+vi.), ii.)+iii.)+vi.), i.)+ii.)+iii.)+vi.), iv.)+vi.), i.)+iv.)+vi.), ii.)+iv.)+vi.), i.)+ii.)+iv.)+vi.), iii.)+iv.)+vi.), i.)+iii.)+iv.)+vi.), ii.)+iii.)+iv.)+vi.), i.)+ii.)+iii.)+iv.)+vi.), v.)+vi.), i.)+v.)+vi.), ii.)+v.)+vi.), i.)+ii.)+v.)+vi.), iii.)+v.)+vi.), i.)+iii.)+v.)+vi.), ii.)+iii.)+v.)+vi.), i.)+ii.)+iii.)+v.)+vi.), iv.)+v.)+vi.), i.)+iv.)+v.)+vi.), ii.)+iv.)+v.)+vi.), i.)+ii.)+iv.)+v.)+vi.), iii.)+iv.)+v.)+vi.), i.)+iii.)+iv.)+v.)+vi.), ii.)+iii.)+iv.)+v.)+vi.), i.)+ii.)+iii.)+iv.)+v.)+vi.), vii.), i.)+vii.), ii.)+vii.), i.)+ii.)+vii.), iii.)+vii.), i.)+iii.)+vii.), ii.)+iii.)+vii.), i.)+ii.)+iii.)+vii.), iv.)+vii.), i.)+iv.)+vii.), ii.)+iv.)+vii.), i.)+ii.)+iv.)+vii.), iii.)+iv.)+vii.), i.)+iii.)+iv.)+vii.), ii.)+iii.)+iv.)+vii.), i.)+ii.)+iii.)+iv.)+vii.), v.)+vii.), i.)+v.)+vii.), ii.)+v.)+vii.), i.)+ii.)+v.)+vii.), iii.)+v.)+vii.), i.)+iii.)+v.)+vii.), ii.)+iii.)+v.)+vii.), i.)+ii.)+iii.)+v.)+vii.), iv.)+v.)+vii.), i.)+iv.)+v.)+vii.), ii.)+iv.)+v.)+vii.), i.)+ii.)+iv.)+v.)+vii.), iii.)+iv.)+v.)+vii.), i.)+iii.)+iv.)+v.)+vii.), ii.)+iii.)+iv.)+v.)+vii.), i.)+ii.)+iii.)+iv.)+v.)+vii.), vi.)+vii.), i.)+vi.)+vii.), ii.)+vi.)+vii.), i.)+ii.)+vi.)+vii.), iii.)+vi.)+vii.), i.)+iii.)+vi.)+vii.), ii.)+iii.)+vi.)+vii.), i.)+ii.)+iii.)+vi.)+vii.), iv.)+vi.)+vii.), i.)+iv.)+vi.)+vii.), ii.)+iv.)+vi.)+vii.), i.)+ii.)+iv.)+vi.)+vii.), iii.)+iv.)+vi.)+vii.), i.)+iii.)+iv.)+vi.)+vii.), ii.)+iii.)+iv.)+vi.)+vii.), i.)+ii.)+iii.)+iv.)+vi.)+vii.), v.)+vi.)+vii.), i.)+v.)+vi.)+vii.), ii.)+v.)+vi.)+vii.), i.)+ii.)+v.)+vi.)+vii.), iii.)+v.)+vi.)+vii.), i.)+iii.)+v.)+vi.)+vii.), ii.)+iii.)+v.)+vi.)+vii.), i.)+ii.)+iii.)+v.)+vi.)+vii.), iv.)+v.)+vi.)+vii.), i.)+iv.)+v.)+vi.)+vii.), ii.)+iv.)+v.)+vi.)+vii.), i.)+ii.)+iv.)+v.)+vi.)+vii.), iii.)+iv.)+v.)+vi.)+vii.), i.)+iii.)+iv.)+v.)+vi.)+vii.), ii.)+iii.)+iv.)+v.)+vi.)+vii.), i.)+ii.)+iii.)+iv.)+v.)+vi.)+vii.), viii.), i.)+viii.), ii.)+viii.), i.)+ii.)+viii.), iii.)+viii.), i.)+iii.)+viii.), ii.)+iii.)+viii.), i.)+ii.)+iii.)+viii.), iv.)+viii.), i.)+iv.)+viii.), ii.)+iv.)+viii.), i.)+ii.)+iv.)+viii.), iii.)+iv.)+viii.), i.)+iii.)+iv.)+viii.), ii.)+iii.)+iv.)+viii.), i.)+ii.)+iii.)+iv.)+viii.), v.)+viii.), i.)+v.)+viii.), ii.)+v.)+viii.), i.)+ii.)+v.)+viii.), iii.)+v.)+viii.), i.)+iii.)+v.)+viii.), ii.)+iii.)+v.)+viii.), i.)+ii.)+iii.)+v.)+viii.), iv.)+v.)+viii.), i.)+iv.)+v.)+viii.), ii.)+iv.)+v.)+viii.), i.)+ii.)+iv.)+v.)+viii.), iii.)+iv.)+v.)+viii.), i.)+iii.)+iv.)+v.)+viii.), ii.)+iii.)+iv.)+v.)+viii.), i.)+ii.)+iii.)+iv.)+v.)+viii.), vi.)+viii.), i.)+vi.)+viii.), ii.)+vi.)+viii.), i.)+ii.)+vi.)+viii.), iii.)+vi.)+viii.), i.)+iii.)+vi.)+viii.), ii.)+iii.)+vi.)+viii.), i.)+ii.)+iii.)+vi.)+viii.), iv.)+vi.)+viii.), i.)+iv.)+vi.)+viii.), ii.)+iv.)+vi.)+viii.), i.)+ii.)+iv.)+vi.)+viii.), iii.)+iv.)+vi.)+viii.), i.)+iii.)+iv.)+vi.)+viii.), ii.)+iii.)+iv.)+vi.)+viii.), i.)+ii.)+iii.)+iv.)+vi.)+viii.), v.)+vi.)+viii.), i.)+v.)+vi.)+viii.), ii.)+v.)+vi.)+viii.), i.)+ii.)+v.)+vi.)+viii.), iii.)+v.)+vi.)+viii.), i.)+iii.)+v.)+vi.)+viii.), ii.)+iii.)+v.)+vi.)+viii.), i.)+ii.)+iii.)+v.)+vi.)+viii.), iv.)+v.)+vi.)+viii.), i.)+iv.)+v.)+vi.)+viii.), ii.)+iv.)+v.)+vi.)+viii.), i.)+ii.)+iv.)+v.)+vi.)+viii.), iii.)+iv.)+v.)+vi.)+viii.), i.)+iii.)+iv.)+v.)+vi.)+viii.), ii.)+iii.)+iv.)+v.)+vi.)+viii.), i.)+ii.)+iii.)+iv.)+v.)+vi.)+viii.), vii.)+viii.), i.)+vii.)+viii.), ii.)+vii.)+viii.), i.)+ii.)+vii.)+viii.), iii.)+vii.)+viii.), i.)+iii.)+vii.)+viii.), ii.)+iii.)+vii.)+viii.), i.)+ii.)+iii.)+vii.)+viii.), iv.)+vii.)+viii.), i.)+iv.)+vii.)+viii.), ii.)+iv.)+vii.)+viii.), i.)+ii.)+iv.)+vii.)+viii.), iii.)+iv.)+vii.)+viii.), i.)+iii.)+iv.)+vii.)+viii.), ii.)+iii.)+iv.)+vii.)+viii.), i.)+ii.)+iii.)+iv.)+vii.)+viii.), v.)+vii.)+viii.), i.)+v.)+vii.)+viii.), ii.)+v.)+vii.)+viii.), i.)+ii.)+v.)+vii.)+viii.), iii.)+v.)+vii.)+viii.), i.)+iii.)+v.)+vii.)+viii.), ii.)+iii.)+v.)+vii.)+viii.), i.)+ii.)+iii.)+v.)+vii.)+viii.), iv.)+v.)+vii.)+viii.), i.)+iv.)+v.)+vii.)+viii.), ii.)+iv.)+v.)+vii.)+viii.), i.)+ii.)+iv.)+v.)+vii.)+viii.), iii.)+iv.)+v.)+vii.)+viii.), i.)+iii.)+iv.)+v.)+vii.)+viii.), ii.)+iii.)+iv.)+v.)+vii.)+viii.), i.)+ii.)+iii.)+iv.)+v.)+vii.)+viii.), vi.)+vii.)+viii.), i.)+vi.)+vii.)+viii.), ii.)+vi.)+vii.)+viii.), i.)+ii.)+vi.)+vii.)+viii.), iii.)+vi.)+vii.)+viii.), i.)+iii.)+vi.)+vii.)+viii.), ii.)+iii.)+vi.)+vii.)+viii.), i.)+ii.)+iii.)+vi.)+vii.)+viii.), iv.)+vi.)+vii.)+viii.), i.)+iv.)+vi.)+vii.)+viii.), ii.)+iv.)+vi.)+vii.)+viii.), i.)+ii.)+iv.)+vi.)+vii.)+viii.), iii.)+iv.)+vi.)+vii.)+viii.), i.)+iii.)+iv.)+vi.)+vii.)+viii.), ii.)+iii.)+iv.)+vi.)+vii.)+viii.), i.)+ii.)+iii.)+iv.)+vi.)+vii.)+viii.), v.)+vi.)+vii.)+viii.), i.)+v.)+vi.)+vii.)+viii.), ii.)+v.)+vi.)+vii.)+viii.), i.)+ii.)+v.)+vi.)+vii.)+viii.), iii.)+v.)+vi.)+vii.)+viii.), i.)+iii.)+v.)+vi.)+vii.)+viii.), ii.)+iii.)+v.)+vi.)+vii.)+viii.), i.)+ii.)+iii.)+v.)+vi.)+vii.)+viii.), iv.)+v.)+vi.)+vii.)+viii.), i.)+iv.)+v.)+vi.)+vii.)+viii.), ii.)+iv.)+v.)+vi.)+vii.)+viii.), i.)+ii.)+iv.)+v.)+vi.)+vii.)+viii.), iii.)+iv.)+v.)+vi.)+vii.)+viii.), i.)+iii.)+iv.)+v.)+vi.)+vii.)+viii.), ii.)+iii.)+iv.)+v.)+vi.)+vii.)+viii.), i.)+ii.)+iii.)+iv.)+v.)+vi.)+vii.)+viii.).

|11| The layered optical composite according to any of the preceding embodiments, wherein the coating comprises a coating layer made of an inorganic material.

|12| The layered optical composite according to embodiment |11|, wherein the inorganic material comprises a first element having an electronegativity below 2, preferably above 1.2, and a further element having an electronegativity above 2. Electronegativity is preferably according to the Pauling method.

|13| The layered optical composite according to any of the preceding embodiments, wherein the coating comprises a coating layer made of a material selected from the group consisting of: $SiO_2$, $MgF_2$ and a mixed oxide comprising $SiO_2$ and a further oxide. A preferred mixed oxide in this context comprises $SiO_2$ and $Al_2O_3$. A preferred mixed oxide in this context comprises $SiO_2$ in the range from 50 to 98 wt. %, more preferably from 60 to 95 wt. %, more preferably from 70 to 93 wt. %. A preferred mixed oxide in this context comprises $SiO_2$ up to 98 wt. %, more preferably up to 95 wt. %, more preferably up to 93 wt. %. A preferred mixed oxide in this context comprises at least 50 wt. % $SiO_2$, more preferably at least 60 wt. %, more preferably at least 70 wt. %. A preferred mixed oxide in this context is comprises $SiO_2$ in the range from 50 to 98 wt. %, more preferably from 60 to 95 wt. %, more preferably from 70 to 93 wt. % and $Al_2O_3$ in the range from 2 to 50 wt. %, more preferably from 5 to 40 wt. %, more preferably from 7 to 30 wt. %.

|14| The layered optical composite according to any of the preceding embodiments, wherein the coating comprises a coating layer made of a material selected from the group consisting of: $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof and a mixed oxynitride comprising at least one thereof; preferably made of a material selected from the group consisting of $ZrO_2$, $Ta_2O_5$, $HfO_2$, $Nb_2O_5$, $TiO_2$. and a mixed oxide comprising at least one thereof. In one aspect of this embodiment, the coating layer is made of $ZrO_2$, or $HfO_2$, preferably $ZrO_2$. Preferred mixed oxides are $TiO_2/SiO_2$; $Nb_2O_5/SiO_2$ and $ZrO_2/Y_2O_3$. A preferred mixed nitride is AlSiN. A preferred mixed oxynitride is AlSiON.

|15| The layered optical composite according to any of the preceding embodiments, wherein the substrate is selected from glass, polymer, optoceramics or crystals.

|16| The layered optical composite according to any of the preceding embodiments, wherein the substrate is selected form the group consisting of: a niobium phosphate glass, a lanthanum borate glass, a bismuth oxide glass, a silicate based glass.

|17| The layered optical composite according to any of the preceding embodiments, comprising a means for coupling light into or decoupling light out of the layered optical composite.

|18| The layered optical composite according to embodiment |17|, wherein the means for coupling light in has a coupling surface area in the range from 1 $mm^2$ to 100 $mm^2$, preferably in the range from 5 to 80 $mm^2$, more preferably in the range from 10 to 60 $mm^2$.

|19| The layered optical composite according to embodiment |17| or |18|, wherein the means for coupling light in has a coupling surface area of at least 1 $mm^2$, preferably at least 5 $mm^2$, more preferably at least 10 $mm^2$.

|20| The layered optical composite according to any of the embodiments embodiment |17| to |19|, wherein the means for coupling light in has a coupling surface area of up to 100 $mm^2$, preferably up to 80 $mm^2$, more preferably up to 60 $mm^2$.

|21| The layered optical composite according to any of the embodiments |17| to |20|, wherein the means for coupling in is arranged and adjusted to couple light into the layered optical composite to propagate transverse to a normal vector to the front face.

|22| The layered optical composite according to any of the embodiments |17| to |21|, wherein the coupling means is arranged and adjusted to deviate light by an angle of at least 30°, or at least 90°, or at least 135°. This angle may be up to 180°.

|23| The layered optical composite according to any of the embodiments |17| to |22|, wherein the layered optical composite comprises a means for coupling light in and a means for decoupling light out, wherein the angle between the direction of travel of the light coupled in and the light coupled out is at least 30°, or at least 90°, or at least 135°. This angle may be up to 180°.

|24| The layered optical composite according to any of the embodiments |17| to |23|, wherein the layered optical composite comprises a means for coupling light in over a first surface area and a means for decoupling light out over a further surface area, wherein the first surface area is less than the further surface area. The further surface area is preferably at least 2 times the first surface area, more preferably at least 5 time, more preferably at least 10 times.

|25| The layered optical composite according to any of the preceding embodiments, wherein the layered optical composite is a wafer.

|26| The layered optical composite according to embodiment |25|, wherein one or more, or all, of the following criteria is satisfied:

i.) The front face has a surface area in the range from 1 to 400 $cm^2$, preferably in the range 5 to 200 $cm^2$, more preferably in the range from 10 to 30 $cm^2$, or The front face has a surface area of at least 1 $cm^2$, preferably at least 5 $cm^2$, from more preferably at least 10 $cm^2$; or
the front face has a surface area of up to 400 $cm^2$, preferably up to 200 $cm^2$, more preferably up to 30 $cm^2$;

ii.) The thickness of the substrate $t_G$ is in the range from 50 to 1500 μm, preferably in the range from 100 to 1000 μm, more preferably in the range from 150 to 500 μm, more preferably in the range from 150 to 450 μm, more preferably in the range from 150 to 400 μm.
The thickness of the substrate $t_G$ is at least 50 μm, preferably at least 100 μm, more preferably at least 150 μm; or
the thickness of the substrate $t_G$ is up to 1500 μm, preferably up to 1000 μm, more preferably up to 500 μm, more preferably up to 450 μm, more preferably up to 400 μm;

iii.) A radius of curvature of the substrate of greater than 600 mm, preferably greater than 800 mm, more preferably greater than 1100 mm;

iv.) A in-plane optical loss measured perpendicular to the front face of at most 20%, preferably at most 15%, more preferably at most 10%;

v.) A surface roughness of the substrate of less than 5 nm, preferably less than 3 nm, more preferably less than 2 nm;

vi.) A surface roughness of the coating of less than 5 nm, preferably less than 3 nm, more preferably less than 2 nm;

vii.) Total thickness variation of the substrate of less than 5 μm, preferably less than 4 μm, more preferably less than 3 μm, more preferably less than 2 μm;

viii.) A min-max local thickness variation over 75% of the front face of less than 5 μm preferably less than 4 μm, more preferably less than 3 μm, more preferably less than 2 μm;

ix.) A warp of the optical layered composite of less than 350 μm, preferably warp of less than 300 μm, more preferably a warp of less than 250 μm;

x.) A bow of the optical layered composite of less than 300 μm, preferably bow of less than 250 μm, more preferably a bow of less than 200 μm;

xi.) A circular or square shape.

In some aspects of this embodiment, the following combination of features are satisfied: i., ii., iii., iv., v., vi., vii., viii., ix., x., xi., i.+ii., i.+iii., i.+iv., i.+v., i.+vi., i.+vii., i.+viii., i.+ix., i.+x., i.+xi., ii.+iii., ii.+iv., ii.+v., ii.+vi., ii.+vii., ii.+viii., ii.+ix., ii.+x., ii.+xi., iii.+iv., iii.+v., iii.+vi., iii.+vii., iii.+viii., iii.+ix., iii.+x., iii.+xi., iv.+v., iv.+vi., iv.+vii., iv.+viii., iv.+ix., iv.+x., iv.+xi., v.+vi., v.+vii., v.+viii., v.+ix., v.+x., v.+xi., vi.+vii., vi.+viii., vi.+ix., vi.+x., vi.+xi., vii.+viii., vii.+ix., vii.+x., vii.+xi., viii.+ix., viii.+x., viii.+xi., ix.+x., ix.+xi., x.+xi., ii.+iii.+iv.+v.+vi.+vii.+viii.+ix.+x.+xi., i.+iii.+iv.+v.+vi.+v ii.+viii.+ix.+x.+xi., i.+ii.+iv.+v.+vi.+ vii.+viii.+ix.+x.+xi., i.+ii.+iii.+v.+vi.+vii.+viii.+ix.+x.+xi., i.+ii.+iii.+iv.+vi.+vii.+viii.+ix.+x.+xi., i.+ii.+iii.+iv.+v.+vii.+viii.+ix.+x.+xi., i.+ii.+iii.+v.+v.+vi.+viii.+ix.+x.+xi., i.+ii.+iii.+iv.+v.+vi.+vii.+ix.+x.+xi., i.+ii.+iii.+iv.+v.+vi.+vii.+viii.+x.+xi., i.+ii.+iii.+iv.+v.+vi.+vii.+viii.+ix.+xi., i.+ii.+iii.+iv.+v.+vi.+vii.+viii.+ix.+x. & i.+ii.+iii.+iv.+v.+vi.+vii.+viii.+ix.+x.+x.

|27| The optical layered composite according to any of the preceding embodiments, wherein one or more of the following is satisfied:
  a. The thickness of the optical layered composite is in the range in the range from 250 to 700 μm; or
    The thickness of the optical layered composite is at least 250 μm; or
    The thickness of the optical layered composite is up to 700 μm.
  b. The thickness $t_T$ of the T-type layer exceeds 60% of the total thickness $t_C$ of the grouping of C-type layers
  c. The thickness $t_C$ of the coating is less than 0.6% of the thickness $t_G$ of substrate.
  d. The radius of curvature of the substrate is greater than 1100 mm; and the radius of curvature of the layered composite is greater than 800 mm.
  e. A min-max local thickness variation over 75% of the front face of less than 2 μm; and
    the warp of the optical layered composite is less than 250 μm; and
    the bow of the optical layered composite is less than 300
  f. The surface roughness of the substrate is less than 3 nm; and
    the surface roughness of the type-C-coating is less than 2 nm; and
    the surface roughness of the type-T-coating is less than 4 nm.
  g. The transmittance measured perpendicular to the front face is at least 85%.

In some aspects of this embodiment, the following combination of features are satisfied:
a., b., a.+b., c., a.+c., b.+c., a.+b.+c., d., a.+d., b.+d., a.+b.+d., c.+d., a.+c.+d., b.+c.+d., a.+b.+c.+d., e., a.+e., b.+e., a.+b.+e., c.+e., a.+c.+e., b.+c.+e., a.+b.+c.+e., d.+e., a.+d.+e., b.+d.+e., a.+b.+d.+e., c.+d.+e., a.+c.+d.+e., b.+c.+d.+e., a.+b.+c.+d.+e., f., a.+f., b.+f., a.+b.+f., c.+f., a.+c.+f., b.+c.+f, a.+b.+c.+f., d.+f., a.+d.+f, b.+d.+f, a.+b.+d.+f., c.+d.+f, a.+c.+d.+f., b.+c.+d.+f., a.+b.+c.+d.+f, e.+f., a.+e.+f, b.+e.+f., a.+b.+e.+f, c.+e.+f, a.+c.+e.+f, b.+c.+e.+f., a.+b.+c.+e.+f., d.+e.+f., a.+d.+e.+f., b.+d.+e.+f., a.+b.+d.+e.+f., c.+d.+e.+f., a.+c.+d.+e.+f, b.+c.+d.+e.+f, a.+b.+c.+d.+e.+f, g., a.+g., b.+g., a.+b.+g., c.+g., a.+c.+g., b.+c.+g., a.+b.+c.+g., d.+g., a.+d.+g., b.+d.+g., a.+b.+d.+g., c.+d.+g., a.+c.+d.+g., b.+c.+d.+g., a.+b.+c.+d.+g., e.+g., a.+e.+g., b.+e.+g., a.+b.+e.+g., c.+e.+g., a.+c.+e.+g., b.+c.+e.+g., a.+b.+c.+e.+g., d.+e.+g., a.+d.+e.+g., b.+d.+e.+g., a.+b.+d.+e.+g., c.+d.+e.+g., a.+c.+d.+e.+g., b.+c.+d.+e.+g., a.+b.+c.+d.+e.+g., f.+g., a.+f.+g., b.+f.+g., a.+b.+f.+g., c.+f.+g., a.+c.+f.+g., b.+c.+f+g., a.+b.+c.+f+g., d.+f.+g., a.+d.+f.+g., b.+d.+f+g., a.+b.+d.+f+g., c.+d.+f.+g., a.+c.+d.+f.+g., b.+c.+d.+f.+g., a.+b.+c.+d.+f.+g., e.+f+g., a.+e.+f.+g., b.+e.+f+g., a.+b.+e.+f.+g., c.+e.+f.+g., a.+c.+e.+f.+g., b.+c.+e.+f+g., a.+b.+c.+e.+f+g., d.+e.+f.+g., a.+d.+e.+f+g., b.+d.+e.+f.+g., a.+b.+d.+e.+f+g., c.+d.+e.+f.+g., a.+c.+d.+e.+f.+g., b.+c.+d.+e.+f+g., a.+b.+c.+d.+e.+f+g.

|28| A device comprising one or more layered optical composites according to any of the preceding embodiments. Preferred devices are augmented reality devices or virtual reality devices. Preferred devices are visors, glasses or head-up displays.

|29| The device according to embodiment |28|, comprising a grouping of x layered composites according to any of the embodiments |1| to |27|, x being an integer at least 2;
  wherein the x layered composites are arranged in a stack, their front faces being parallel and oriented in the same direction and wherein a spacer region made of a material having a refractive index below 1.3 is present between each pairing of front face with adjacent back face. In one aspect of this embodiment, the spacer region is made of a gas, preferably air. In one aspect of this embodiment, x is preferably in the range from 2 to 20, more preferably in the range from 2 to 15, more preferably in the range from 2 to 10. In one aspect of this embodiment, x is preferably at least 2. In one aspect of this embodiment, x is up to 20, more preferably up to 15, more preferably up to 10. A preferred value of x is 3.

|30| The device according to embodiment |28| or |29|, comprising a light source arranged and adapted to introduce light into the layered optical composite.

|31| A process for preparing a layered optical composite comprising the following process steps:
  i.) Providing a substrate having a front face and a back face;
  ii.) Applying one or more coating layers to the front face or back face or both by physical vapour deposition, preferably by oxidative physical vapour deposition.

|32| Process for making an augmented reality device comprising the following steps:
  i.) Providing a wafer according to embodiment |25| or |26|;
  ii.) Reducing the surface area of the front face to obtain a portion;
  iii.) Providing the portion as a viewing window in the augmented reality device.

|33| Use of a layered optical composite according to any of the embodiments |1| to |27| in an augmented reality device or virtual reality device. Preferred devices are visors, glasses or head-up displays.

Refractive Indices

In the case of a body of homogeneous refractive index, the refractive index of the body is preferably the refractive index of the material from which it is made.

In the case of a body of heterogeneous refractive index, the effective refractive index of the body is preferably the refractive index required of a body of the same thickness having homogeneous refractive index to bring about the same level of refraction for light passing through it in the direction of the normal to the front face. Where there is heterogeneity across the transverse extension, the effective refractive index is an arithmetic mean over the transverse extension.

Wavelengths

Unless otherwise indicated, wavelengths presented in this document are vacuum wavelengths. The vacuum wavelength of radiation is the wavelength it would have if it were propagating in a vacuum. A typical wavelength range for visible light or an RGB-range is from 400 nm to 760 nm.

Superimposition

The term "superimposed" is used in this text in the sense of lying over. When referring to essentially planar items, the term indicates that the planes of the items are essentially parallel. An item which is superimposed over another item can either be in direct contact with it, or can be separated from it by a gap or by the presence of further items, preferably layers, between them. Superimposition can be full, partial in excess, or a combination thereof. For example, a layer which is superimposed over the face of a substrate need not cover the entire face and in particular one or more sections of the face can be uncovered or covered with something else, such as a coupling means.

Thickness

The thickness of the substrate, of substrate layers, of the coating and of coating layers is preferably measured in a direction perpendicular to the front face. The thickness of the substrate, of substrate layers, of the coating and of coating layers is preferably measured in a direction normal to the front face.

In the case of a body having a thickness varying across its transverse extension, the thickness is preferably the arithmetic mean of the thickness over the transverse extension.

Min-max local thickness variation over a portion of an area is the maximum value of thickness variation over the portion, but which has been minimised through selection of the portion. The min-max local thickness variation over 75% of an area is arrived at by selecting a 75% portion of the area in such a manner that the maximum variation over the portion is minimised.

Layered Optical Composite

Preferred layered optical composites are adapted and adjusted to propagate light, preferably an image. A preferred layered optical composite is suitable for propagating light perpendicular to its front face, preferably an image, preferably a real world image. A preferred layered optical composite is suitable for propagating light transverse to its front face, preferably an image, preferably an overlaid image.

In one embodiment, it is preferred for a real world image and an overlaid image to overlap at least partially. This overlapping may be observed at an observation surface displaced from the back face of the layered optical composite, for example in an eye.

An overlaid image is preferably a generated image. An overlaid image is preferably generated by the device of the disclosure. The overlaid image is preferably generated by a controlled light source.

The layered optical composite comprises a substrate and a coating. The thickness of the substrate is preferably at least 100 times the thickness of the coating, more preferably at least 200 times, more preferably at least 400 times, more preferably still at least 1000 times. The thickness of the substrate is preferably up to 15,000 times the thickness of the coating, more preferably up to 10,000 times the thickness of the coating, more preferably up to 5,000 times the thickness of the coating. The ratio of the thickness of the coating to the thickness of the substrate is preferably in the range from 1:20 to 1:15,000, more preferably in the range from 1:50 to 1:5,000, more preferably in the range from 1:200 to 1:4,000.

Preferred layered optical composites are laminar. Preferred layered optical composites have a tertiary extension which less than half the secondary extension. The ratio of the tertiary extension to the secondary extension is preferably in the range from 1:1000 to 1:2, more preferably in the range from 1:1000 to 1:10, more preferably in the range from 1:1000 to 1:100. The secondary extension is preferably at least 2 times the tertiary extension, preferably at least 10 times, more preferably at least 100 times. The secondary extension is preferably up to 1000 times the tertiary extension. The secondary extension might be as large as 10000 times the tertiary extension. The primary extension is the longest extension contained within the object. The secondary extension is the longest extension contained within the object which is perpendicular to the primary extension. The tertiary extension is the extension of the object which is perpendicular to both the primary extension and the secondary extension.

In one embodiment, a preferred layered optical composite has an aspect ratio in the range from 2 to 1000, more preferably in the range from 10 to 1000 more preferably in the range from 100 to 1000. In one embodiment, a preferred layered optical composite has an aspect ratio of up to 1000.

In one embodiment, a preferred layered optical composite has an aspect ratio of at least 2, more preferably at least 10, more preferably at least 100. The aspect ratio might be as high as 10000.

Preferred laminar layered optical composites are suitable for transverse propagation of light, preferably propagation of images.

A preferred thickness of the layered optical composite is in the range from 10 to 1500 µm, more preferably in the range from 10 to 1000 µm, more preferably in the range from 10 to 500 µm, more preferably in the range from 20 to 450 µm, more preferably in the range from 30 to 400 µm.

A preferred thickness of the layered optical composite is up to 1500 µm, more preferably up to 1000 µm, more preferably up to 500 µm, more preferably up to 450 µm, more preferably up to 400 µm.

A preferred thickness of the layered optical composite is at least 10 µm, more preferably at least 20 µm, more preferably at least 30 µm.

The layered optical composite is preferably suitable for use in a device, preferably an augmented reality device. A device can comprise one or more layered optical composites.

Orientations

The substrate has a front face and a back face. The front face and the back face are preferably parallel, having a normal varying by less than 15°, more preferably by less than 10°, more preferably by less than 5°. The normal of the back face is measured at the point on the back face through which the normal to the front face passes.

The front face of the substrate defines a principal direction. The principal direction is preferably the normal to the front face passing through the centre of mass of the object. The principal direction is variously referred to throughout this document as "normal to the front face" and "perpendicular to the front face". As used throughout this document, the term "longitudinal" refers to a direction either parallel or anti-parallel to the principal direction. A direction parallel to the normal or longitudinal is preferably less than 45°, more preferably less than 30°, more preferably less than 10°, more preferably less than 5° from the normal. In the case of a laminar or planar substrate, longitudinal propagation corresponds to travel parallel to the tertiary extension. The primary extension is the longest extension contained within the object. The secondary extension is the longest extension contained within the object which is perpendicular to the primary extension. The tertiary extension is the extension of the object which is perpendicular to both the primary extension and the secondary extension.

The front face defines a plane. The plane is preferably perpendicular to the normal to the front face. The terms "transverse", "lateral" or "in plane" as used in this disclosure refer to a direction perpendicular to the normal to the front face, parallel to the plane. A direction perpendicular to the normal, transverse, lateral or in plane is preferably more than 45°, more preferably more than 60°, more preferably less than 80°, more preferably less than 85° from the normal.

In the case of a laminar or planar substrate, transverse, lateral or in plane propagation corresponds to travel within the laminar or planar extension.

In the context of a device, preferably an augmented reality device, it is preferred for the layered optical composite to be oriented with the back face towards the user and the front face towards the real world.

In one embodiment, the T type layer and the coating are applied to the front face of the substrate.

In one embodiment, the T type layer and the coating are applied to the back face of the substrate. In one embodiment, a T type layer and a coating are applied to the front face of the substrate and a further T type layer and a further coating are applied to the back face of the substrate.

Substrate

Preferred substrates are suitable for propagation of an image, preferably more than one image simultaneously. A preferred substrate is suitable for propagation of a real world image. A preferred substrate is suitable for propagation of an overlaid image.

Preferred substrates are laminar. Preferred substrates have a tertiary extension which less than half the secondary extension. The ratio of the tertiary extension to the secondary extension is preferably in the range from 1:1000 to 1:2, more preferably in the range from 1:1000 to 1:10, more preferably in the range from 1:1000 to 1:100. The secondary extension is preferably at least 2 times the tertiary extension, preferably at least 10 times, more preferably at least 100 times. The secondary extension is preferably up to 1000 times the tertiary extension. The secondary extension might be as large as 10000 times the tertiary extension. The primary extension is the longest extension contained within the object. The secondary extension is the longest extension contained within the object which is perpendicular to the primary extension. The tertiary extension is the extension of the object which is perpendicular to both the primary extension and the secondary extension.

In one embodiment, a preferred substrate has an aspect ratio in the range from 2 to 1000, more preferably in the range from 10 to 1000 more preferably in the range from 100 to 1000. In one embodiment, a preferred substrate has an aspect ratio of up to 1000. In one embodiment, a preferred substrate has an aspect ratio of at least 2, more preferably at least 10, more preferably at least 100. The aspect ratio might be as high as 10000.

Preferred laminar substrates are suitable for transverse propagation of light, preferably of an overlaid image.

A preferred thickness of the substrate is in the range from 10 to 1500 µm, more preferably in the range from 10 to 1000 µm, more preferably in the range from 10 to 500 µm, more preferably in the range from 20 to 450 µm, more preferably in the range from 30 to 400 µm.

A preferred thickness of the substrate is up to 1500 µm, more preferably up to 1000 µm, more preferably up to 500 µm, more preferably up to 450 µm, more preferably up to 400 µm.

A preferred thickness of the substrate is at least 10 µm, more preferably at least 20 µm, more preferably at least 30 µm.

In one embodiment, the substrate has a refractive index of at least 1.60, preferably at least 1.65, more preferably at least 1.70. In one embodiment, the substrate has a refractive index measured at 550 nm of at least 1.60, preferably at least 1.65, more preferably at least 1.70. In one embodiment, the substrate has a refractive index measured at 589 nm of at least 1.60, preferably at least 1.65, more preferably at least 1.70.

In one embodiment, the substrate has a refractive index in the range from 1.60 to 2.40, preferably in the range from 1.65 to 2.35, more preferably in the range from 1.70 to 2.30. In one embodiment, the substrate has a refractive index measured at 550 nm in the range from 1.60 to 2.40, preferably in the range from 1.65 to 2.35, more preferably in the range from 1.70 to 2.30. In one embodiment, the substrate has a refractive index measured at 589 nm in the range from 1.60 to 2.40, preferably in the range from 1.65 to 2.35, more preferably in the range from 1.70 to 2.30.

In one embodiment, the substrate has a refractive index of up to 2.40, preferably up to 2.35, more preferably up to 2.30. In one embodiment, the substrate has a refractive index measured at 550 nm of up to 2.40, preferably up to 2.35, more preferably up to 2.30. In one embodiment, the substrate has a refractive index measured at 589 nm of up to 2.40, preferably up to 2.35, more preferably up to 2.30.

In one embodiment, the substrate has a refractive index in the range from 1.65 to 1.75.

In one embodiment, the substrate has a refractive index in the range from 1.70 to 1.80.

In one embodiment, the substrate has a refractive index in the range from 1.75 to 1.85.

In one embodiment, the substrate has a refractive index in the range from 1.80 to 1.90.

In one embodiment, the substrate has a refractive index in the range from 1.85 to 1.95.

In one embodiment, the substrate has a refractive index in the range from 1.90 to 2.00.

In one embodiment, the substrate has a refractive index in the range from 1.95 to 2.05.

In one embodiment, the substrate has a refractive index in the range from 2.00 to 2.10.

In one embodiment, the substrate has a refractive index in the range from 2.05 to 2.15.

In one embodiment, the substrate has a refractive index in the range from 2.10 to 2.20.

In one embodiment, the substrate has a refractive index in the range from 2.15 to 2.25.

In one embodiment, the substrate has a refractive index measured at 550 nm in the range from 1.65 to 1.75.

In one embodiment, the substrate has a refractive index measured at 550 nm in the range from 1.70 to 1.80.

In one embodiment, the substrate has a refractive index measured at 550 nm in the range from 1.75 to 1.85.

In one embodiment, the substrate has a refractive index measured at 550 nm in the range from 1.80 to 1.90.

In one embodiment, the substrate has a refractive index measured at 550 nm in the range from 1.85 to 1.95.

In one embodiment, the substrate has a refractive index measured at 550 nm in the range from 1.90 to 2.00.

In one embodiment, the substrate has a refractive index measured at 550 nm in the range from 1.95 to 2.05.

In one embodiment, the substrate has a refractive index measured at 550 nm in the range from 2.00 to 2.10.

In one embodiment, the substrate has a refractive index measured at 550 nm in the range from 2.05 to 2.15.

In one embodiment, the substrate has a refractive index measured at 550 nm in the range from 2.10 to 2.20.

In one embodiment, the substrate has a refractive index measured at 550 nm in the range from 2.15 to 2.25.

In one embodiment, the substrate has a refractive index measured at 589 nm in the range from 1.65 to 1.75.

In one embodiment, the substrate has a refractive index measured at 589 nm in the range from 1.70 to 1.80.

In one embodiment, the substrate has a refractive index measured at 589 nm in the range from 1.75 to 1.85.

In one embodiment, the substrate has a refractive index measured at 589 nm in the range from 1.80 to 1.90.

In one embodiment, the substrate has a refractive index measured at 589 nm in the range from 1.85 to 1.95.

In one embodiment, the substrate has a refractive index measured at 589 nm in the range from 1.90 to 2.00.

In one embodiment, the substrate has a refractive index measured at 589 nm in the range from 1.95 to 2.05.

In one embodiment, the substrate has a refractive index measured at 589 nm in the range from 2.00 to 2.10.

In one embodiment, the substrate has a refractive index measured at 589 nm in the range from 2.05 to 2.15.

In one embodiment, the substrate has a refractive index measured at 589 nm in the range from 2.10 to 2.20.

In one embodiment, the substrate has a refractive index measured at 589 nm in the range from 2.15 to 2.25.

A preferred substrate may consist of a single substrate layer or may consist of two or more substrate layers, preferably of a single substrate layer.

In one embodiment, the substrate has a homogeneous chemical composition. In one embodiment, the substrate has a homogeneous refractive index. In the case of a heterogeneous refractive index, the preferred ranges disclosed above preferably hold for the effective refractive index.

In the case of more than one substrate layer, each substrate layer may have a homogeneous chemical composition or a heterogeneous chemical composition, preferably a homogeneous chemical composition. In the case of more than one substrate layer, the preferred ranges disclosed above preferably hold for the mean refractive index of the substrate as a whole. In the case of more than one substrate layer, each substrate layer may have a homogeneous refractive index or a heterogeneous refractive index, preferably a homogeneous refractive index. In the case of a heterogeneous refractive index, the preferred ranges disclosed above preferably hold for the mean refractive index of each layer.

The chemical composition of preferred materials for the substrate is preferably selected to fulfil one or more of the above described physical requirements.

Preferred materials for the substrate are glass or polymer, preferably glass.

Preferred glasses as categorized by the Abbe diagram are glasses having a refractive index of 1.6 or more such as dense flint glasses, lanthanum flint glasses, dense lanthanum flint glasses, barium flint glasses, dense barium flint glasses, dense crown glasses, lanthanum crown glasses, extra dense crown glasses.

In one embodiment, a preferred glass for the substrate is a niobium phosphate glass.

In one embodiment, a preferred glass for the substrate is a lanthanum borate glass.

In one embodiment, a preferred glass for the substrate is a bismuth oxide glass.

In one embodiment, a preferred glass for the substrate is a silicate based glass.

A preferred glass group comprises one or more selected from the group consisting of: niobium phosphate glasses, lanthanum borate glasses, bismuth oxide glasses, silicate glasses whereas silicate glasses preferably contain one or more of $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, $BaO$, $SrO$, $ZnO$, $Cs_2O$ and $PbO$.

A preferred silicate based glass comprises at least 30 wt. % $SiO_2$, preferably at least 40 wt. % $SiO_2$, more preferably at least 50 wt. % $SiO_2$. A preferred silicate glass comprises at most 80 wt. % $SiO_2$, more preferably at most 70 wt. %, more preferably at most 60 wt. %. A preferred silicate based glass comprises $SiO_2$ in a range from 30 to 80 wt. %, more preferably in a range from 40 to 70 wt. %, more preferably in a range from 50 to 60 wt. %. A preferred silicate based glass comprises one or more selected from the group consisting of: $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, $BaO$, $SrO$, $ZnO$, $Cs_2O$ and $PbO$, preferably in a total amount of at least 20 wt. %, more preferably at least 30 wt. %, more preferably at least 40 wt. %, more preferably at least 50 wt. %. A preferred silicate based glass might comprises one or more selected from the group consisting of: $TiO_2$, $La_2O_3$, $Bi_2O_3$, $Gd_2O_3$, $Nb_2O_5$, $Y_2O_3$, $Yb_2O_3$, $Ta_2O_5$, $WO_3$, $GeO_2$, $Ga_2O_3$, $ZrO_2$, $BaO$, $SrO$, $ZnO$, $Cs_2O$ and $PbO$ in a total amount of as much as 70 wt. %.

In one embodiment, a preferred glass is commercially available from SCHOTT under one of the following names: N-SF66, P-SF67, P-SF68, N-BASF64, N-SF1, N-SF6, N-SF8, N-SF15 and NSF57, from Sumita under the name K-PSFn214, from OHARA under the name L-BBH1, and HOYA TaFD55.

A preferred polymer in this context is a plastic.

Preferred polymers in this context are polycarbonates (PC) such as Lexan® or Merlon®, polystyrenes (PS) such as Styron® or Lustrex®, acrylic polymers (PMMA) such as Lucite®, Plexiglass® or Polycast®, polyetherimides (PEI) such as Ultem® or Extern®, polyurethanes (PU) such as Isoplast®, cyclic olefin copolymers (COC) such as Topas®, cyclic olefin polymer (COP) such as Zeonex® or Zeonor®, polyesters, such as OKP4 and OKP4HP, polyethersulfones (PES) such as Radel®, and HTLT®. One preferred polymer material is allyl diglycol carbonate (such as CR-39). One preferred polymer material is urethane based.

Preferred optoceramics are yttrium aluminum granite (YAG, $Y_3Al_5O_{12}$) and variants thereof, lutetium aluminum granite (LuAG), optoceramics with cubic pyrochloric structure or fluorite structure as described in DE 10 2007 022 048 A1 or zinc sulphide. Preferred crystals are sapphire, anatase, rutile, diamond, zinc sulphide and spinel.

Coating

A preferred coating is suitable for reducing reflection of light incident on the layered optical composite. In the case of a coating applied to the front face, the coating is suitable for reducing reflection of light at the front face. In the case of a coating applied to the back face, the coating is suitable for reducing reflection of light at the back face.

A preferred coating reduces impairment of light propagation in the substrate, preferably reduces impairment of transverse propagation of light in the substrate.

A preferred coating layer is laminar or planar. The coating preferably extends in a plane parallel to that of the substrate.

The coating preferably coats at least 80% of the front face by area, preferably at least 90%, more preferably at least 95%, more preferably at least 99%, most preferably all of the front face.

A coating comprises one or more coating layers. The coating is preferably made as a stack of coating layers, preferably arranged as a stack of co-planer laminas.

The thickness of the coating is preferably determined normal to the front face.

A preferred coating produces a low reflectance region.

A preferred low reflectance region is over the range from 430 to 670 nm. The maximum reflectance in the range from 450 to 650 nm is preferably not more than 50% of the maximum reflectance in the range from 450 to 650 nm for the uncoated substrate, preferably not more than 40%, more preferably not more than 30%.

The maximum reflectance in the range from 450 to 650 nm is preferably less than 5%, preferably less than 4%, more preferably less than 3%, more preferably less than 2%, preferably less than 1.5%, more preferably less than 1.1%.

A preferred low reflectance region covers a broad wavelength range. Preferably there is a region of width of at least 175 nm, more preferably at least 200 nm, more preferably at least 225 nm, more preferably at least 250 nm, in which the maximum reflectance minus the minimum reflectance is less than 2%

A preferred low reflectance region is flat. The maximum reflectance in the range from 450 to 650 nm minus the minimum reflectance in the range from 450 to 650 nm is preferably less than 1.5%, more preferably less than 1.0%, most preferably less than 0.8%.

The coating according to the disclosure comprises one or more C type layers. The C type layers are defined in the claims and in particular have a minimum thickness of 9 nm. The coating may further comprises other layers not falling within the scope of a C-type layer as defined in the claims. In particular, the coating may comprise one or more very thin so-called needle layers. A needle layer often has no impact on the optical properties of the composite. A needle layer might have a thickness of less than 9 nm and as low as 1 nm. A so-called needle layer could be as thin as an atomic mono-layer.

Coating Layers

The coating comprises 1 or more coating layers, referred to in the claims as C type layers. Coating layers are preferably arranged in a stack with each coating layer parallel to the front face.

A preferred coating layer has a homogeneous chemical composition A preferred coating layer has a chemical composition in which the maximum local wt. % of an element is less than 1.2 times the minimum local wt. % of the element, preferably less than 1.1, more preferably less than 1.05. Preferably this applies for each element.

A preferred coating layer either has a homogeneous refractive index A preferred coating layer has a maximum local refractive index, which is less than 1.2 time the minimum local refractive index, preferably less than 1.1, more preferably less than 1.05.

A preferred coating layer has a constant thickness across its transverse extension. A preferred coating layer has a ratio of smallest thickness to largest thickness in the range from 1:1 to 1:1.1, preferably in the range from 1:1 to 1:1.05, more preferably in the range from 1:1 to 1:1.01.

One group of materials from which to select the material of one or more of the C type layers consists of: $Si_3N_4$, $ZrO_2$, $Ta_2O_5$, $HfO_2$, $Nb_2O_5$, $TiO_2$, $SnO_2$, indium tin oxide, $ZnO_2$, AlN, a mixed oxide comprising at least one thereof, a mixed nitride comprising at least one thereof and a mixed oxynitride comprising at least one thereof; preferably made of a material selected from the group consisting of $ZrO_2$, $Ta_2O_5$, $HfO_2$, $Nb_2O_5$, $TiO_2$. and a mixed oxide comprising at least one thereof. In one aspect of this embodiment, the coating layer is made of $ZrO_2$, or $HfO_2$, preferably $ZrO_2$. Preferred mixed oxides are $TiO_2/SiO_2$; $Nb_2O_5/SiO_2$ and $ZrO_2/Y_2O_3$. A preferred mixed nitride is AlSiN. A preferred mixed oxynitride is AlSiON.

Another group of materials from which to select the material of one or more of the C type layers consists of: $SiO_2$, $MgF_2$ and a mixed oxide comprising $SiO_2$ and a further oxide. A preferred mixed oxide in this context comprises $SiO_2$ and $Al_2O_3$. A preferred mixed oxide in this context comprises $SiO_2$ in the range from 50 to 98 wt. %, more preferably from 60 to 95 wt. %, more preferably from 70 to 93 wt. %. A preferred mixed oxide in this context comprises $SiO_2$ up to 98 wt. %, more preferably up to 95 wt. %, more preferably up to 93 wt. %. A preferred mixed oxide in this context comprises at least 50 wt. % $SiO_2$, more preferably at least 60 wt. %, more preferably at least 70 wt. %. A preferred mixed oxide in this context is comprises $SiO_2$ in the range from 50 to 98 wt. %, more preferably from 60 to 95 wt. %, more preferably from 70 to 93 wt. % and $Al_2O_3$ in the range from 2 to 50 wt. %, more preferably from 5 to 40 wt. %, more preferably from 7 to 30 wt. %.

In one embodiment, the coating comprises a single C type layer. In another embodiment, the coating comprises two or more C type layers.

T-Type Layer

The coating of the disclosure comprises a T type layer. A preferred t type layer reduces absorption of propagated radiation, more preferably at least at a specified wavelength in the range from 430 to 670 nm.

Some preferred materials for the T type layer are those listed for the c-type layer. Some particularly preferred materials for the T type layer include the following: KF, $AlF_3$, $HfO_2$, $SiO_2$, $Al_2O_3$, and a mixture of $Al_2O_3/Pr6O_{11}$.

Coupling and Decoupling

A preferred coupling means is suitable for introducing light into the layered optical composite, preferably for introducing an image into the layered optical composite, preferably an overlaid image. A preferred decoupling means is suitable for removing light from the layered optical composite, preferably for removing an image from the layered optical composite, preferably an overlaid image.

In one embodiment, a coupling means is provided for introducing an overlaid image into the layered optical composite. In one embodiment, a coupling means is provided for introducing an image into the layered optical composite for transverse propagation.

In one embodiment, a decoupling means is provided for removing an overlaid image from the layered optical composite, preferably out of the back face. In one embodiment, a decoupling means is provided for removing an image from the layered optical composite, wherein the image is propagating in a transverse direction.

In one embodiment, no coupling or decoupling means is provided for the real world image.

In one embodiment, a coupling means is provided for introducing light into the layered optical composite.

In one embodiment, a de-coupling means is provided for taking light out of the layered optical composite.

Preferred coupling means are a prism or a diffraction grating.

Coupling and decoupling means may be integrated into the layered optical composite or provide externally to it, preferably attached to it.

In one embodiment the layered optical composite comprises more decoupling means than coupling means.

In one embodiment light coupled in by a single coupling means is decoupled by two or more decoupling means.

In one embodiment, the layered optical composite comprises two or more decoupling means and each decoupling means corresponds to a pixel of an image.

A coupling means may be present at the front, side or rear of the layered optical composite, preferably at the rear or at the side.

A decoupling means is preferably present on the back side of the layered optical composite.

Coupling preferably comprises deviation of light by an angle in the range from 30 to 180°, preferably in the range from 45 to 180°, more preferably in the range from 90 to 180°, more preferably in the range from 135 to 180°. Coupling preferably comprises deviation of light by an angle of at least 30°, preferably at least 45°, more preferably at least 90°, more preferably at least 135°.

Decoupling preferably comprises deviation of light by an angle in the range from 30 to 180°, preferably in the range from 45 to 135°, more preferably in the range from 60 to 120°, more preferably in the range from 70 to 110°. Decoupling preferably comprises deviation of light by an angle of at least 30°, preferably at least 45°, more preferably at least 60°, more preferably at least 70°. Decoupling preferably comprises deviation of light by an angle up to 180°, preferably up to 135°, more preferably up to 120°, more preferably up to 110°.

Process

The layered optical composite can be prepared by any method known to the skilled person and which he considers suitable. Preferred methods comprise physical vapour deposition. Preferred physical vapour deposition is sputtering or evaporation, preferably evaporation. A preferred physio vapour deposition is oxidative physical vapour deposition.

The process preferably comprises a cleaning step, preferably of the front face. A preferred cleaning step may comprise ultrasound. A preferred cleaning step may involve water; an alkaline cleaner, preferably having a pH in the range from 7.5 to 9; or a pH neutral cleaner other than water.

Coating layers are preferably deposited at a rate in the range from 0.5 to 10 Å/s, preferably in the range from 0.75 to 8 Å/s, more preferably in the range from 1 to 5 Å/s. Coating layers are preferably deposited at a rate of at least 0.5 Å/s, preferably at least 0.75 Å/s, more preferably at least 1 Å/s. Coating layers are preferably deposited at a rate of up to 10 Å/s, preferably up to 8 Å/s, more preferably up to 5 Å/s.

Physical vapour deposition is preferably performed with a substrate temperature in the range from 110 to 250° C., more preferably in the range from 120 to 230° C., more preferably in the range from 140 to 210° C. Physical vapour deposition is preferably performed with a substrate temperature of at least 110° C., more preferably at least 120° C., more preferably at least 140° C. Physical vapour deposition is preferably performed with a substrate temperature up to 250° C., more preferably up to 230° C., more preferably up to 210° C.

In the case of polymer substrates, lower deposition ranges are preferred such as from 100 to 150° C.

Physical vapour deposition is preferably performed under a pressure of less than $1 \times 10^{-2}$ Pa, more preferably less than $5 \times 10^{-3}$ Pa, more preferably less than $3 \times 10^{-3}$ Pa.

Device

A contribution to overcoming at least one of the above referenced objects is made by a device comprises one or more layered optical composites according to the disclosure.

A device may comprises 2 or more layered optical composites according to the disclosure. Layered optical composites are preferably spaced. A preferred spacing is in the range from 600 nm to 1 mm, preferably in the range from 5 µm to 500 µm, more preferably in the range from 50 µm to 400 µm. A preferred spacing is at least 600 nm, preferably at least 5 µm, more preferably at least 50 µm. A preferred spacing is up to 1 mm, preferably up to 500 µm, more preferably up to 400 µm. In a device comprising 2 or more layered optical composites, the layered optical composites may be adapted and arranged for different wavelengths of light.

In one embodiment, three layered optical composites are provided for propagating red, green and blue light respectively. In one aspect of this embodiment, a layered optical composite is provided for propagating light having a wavelength in the range from 564 to 580 nm. In one aspect of this embodiment, a layered optical composite is provided for propagating light having a wavelength in the range from 534 to 545 nm. In one aspect of this embodiment, a layered optical composite is provided for propagating light having a wavelength in the range from 420 to 440 nm.

The device preferably comprises a projector for projecting an image into the layered optical composite via a coupling means.

In-Plane Optical Loss

One aspect of the present disclosure relates to a method for determining in-plane optical loss through target. The method preferably comprises passing light through the target and measuring intensity of scattered light, preferably at a position perpendicularly displaced from the path of the light through the target. The method preferably comprises fitting an exponential decay to the intensity of scattered light with respect to path length through the target. A light trap is preferably located at the end of the path length through the target.

A contribution to achieving at least one of the above described objects is made by a process for selecting a layered optical composite comprising the following steps:
 a. Providing two or more layered optical composites
 b. Determining the in-plane optical loss of the layered optical composites according to the method described herein
 c. Selecting one or more of the layered optical composites.

Referring to the Figures, FIG. 1 shows a layered optical composite according to the present disclosure having a substrate, a t type layer and 3 coating layers. The layered optical composite 100 comprises a substrate 100 having a front face and a back face. The direction 107 emanates from the front face and the direction 106 emanates from the back face. On the front face is applied the t type layer 102 and a coating consisting of a first coating layer 103, a second coating layer 104, and a third coating layer 105. The t type layer and the coating could alternatively be applied to the back face.

Figure 2:
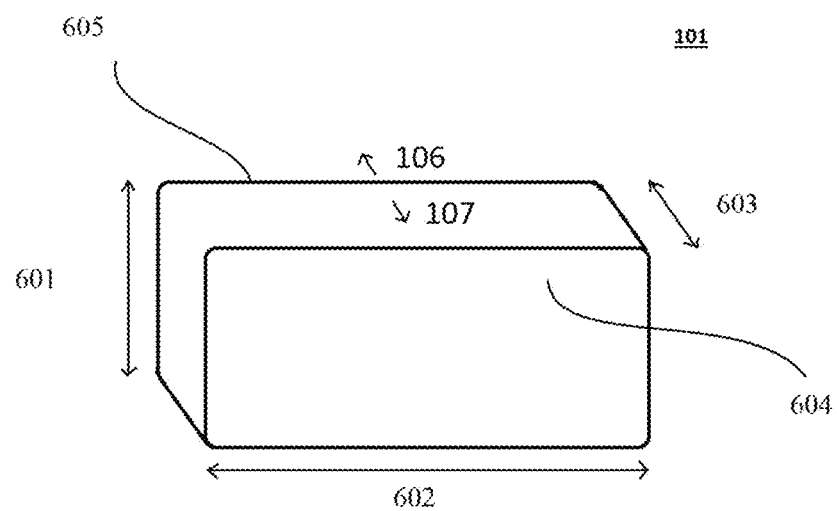
FIG. 2 shows a substrate employed in the present disclosure.

FIG. 2 shows a substrate employed in the present disclosure. The substrate 101 has a front face 604, a back face 605. The direction 107 emanates from the front face 604 and is perpendicular to it. The direction 106 emanates from the back face 605 and is perpendicular to it. The substrate has a length 602 and width 601, each parallel to the front face. The substrate has a thickness 603 determined perpendicular to the front face 604.

Figure 3:
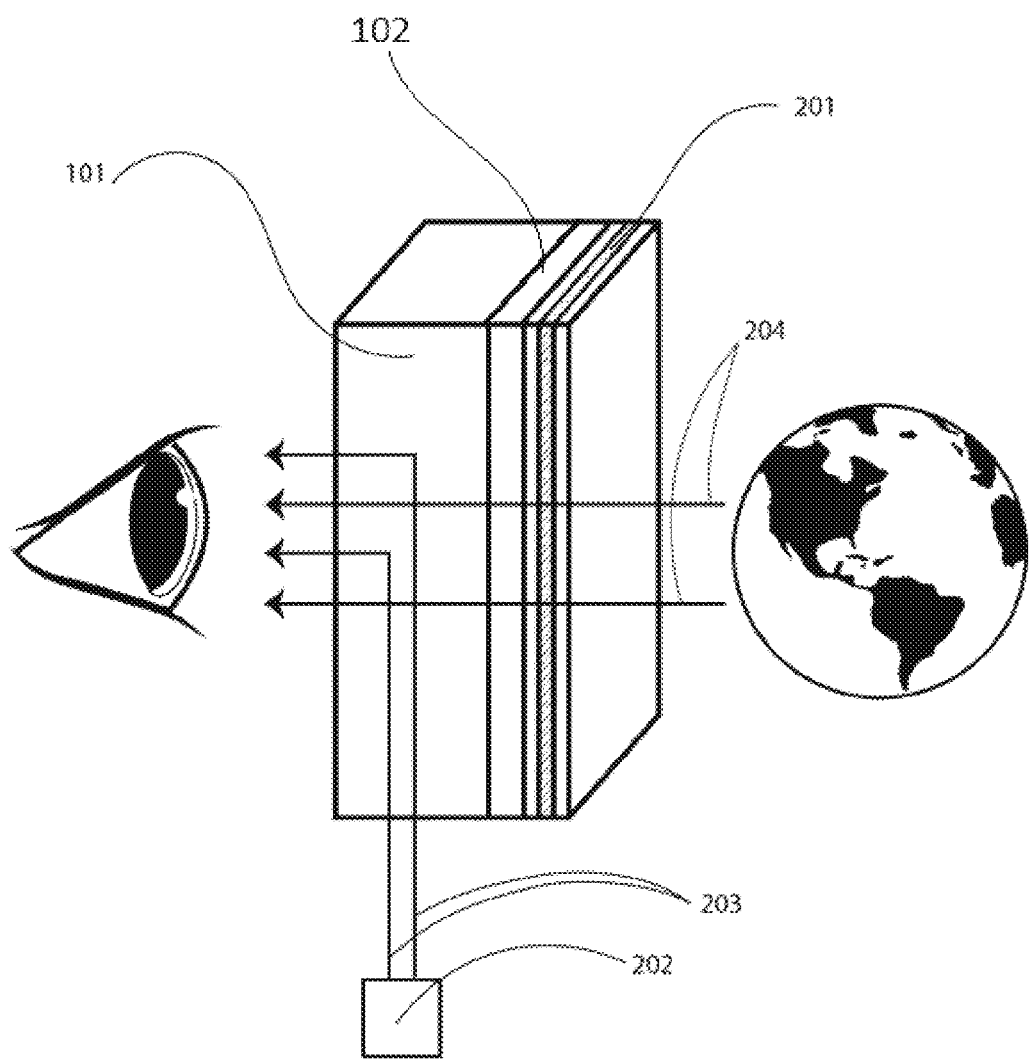
FIG. 3 shows a layered optical composite according to the present disclosure with side coupling of an overlaid image.

FIG. 3 shows a layered optical composite according to the present disclosure with side coupling of an overlaid image. The layered optical composite has a substrate 101 having a front face and a back face. On the front face of the substrate 101 is applied a t type layer 102 and a coating 201. A real world image 204 enters the layered optical composite through the front face, piercing the coating 201, the t type layer 102 and the substrate 101, to pass out of the back face. An overlaid image 203 is generated at a projector 202, positioned to the side of the layered optical composite, and passes through the layered optical composite transverse to the front face to then exit through the back face. The real world image 204 and the overlaid image 203 are both viewed by a viewer located behind the back face. In a variant, the t type layer 102 and the coating 201 may be applied to the back face rather than the front face. In a variant, t type layers 102 and coatings 201 are applied to both the back face and the front face. Not shown are decoupling means on the back face, for example diffraction gratings. Where a coating is present on the back face, the decoupling means is preferably located between the substrate and the coating.

Figure 4:
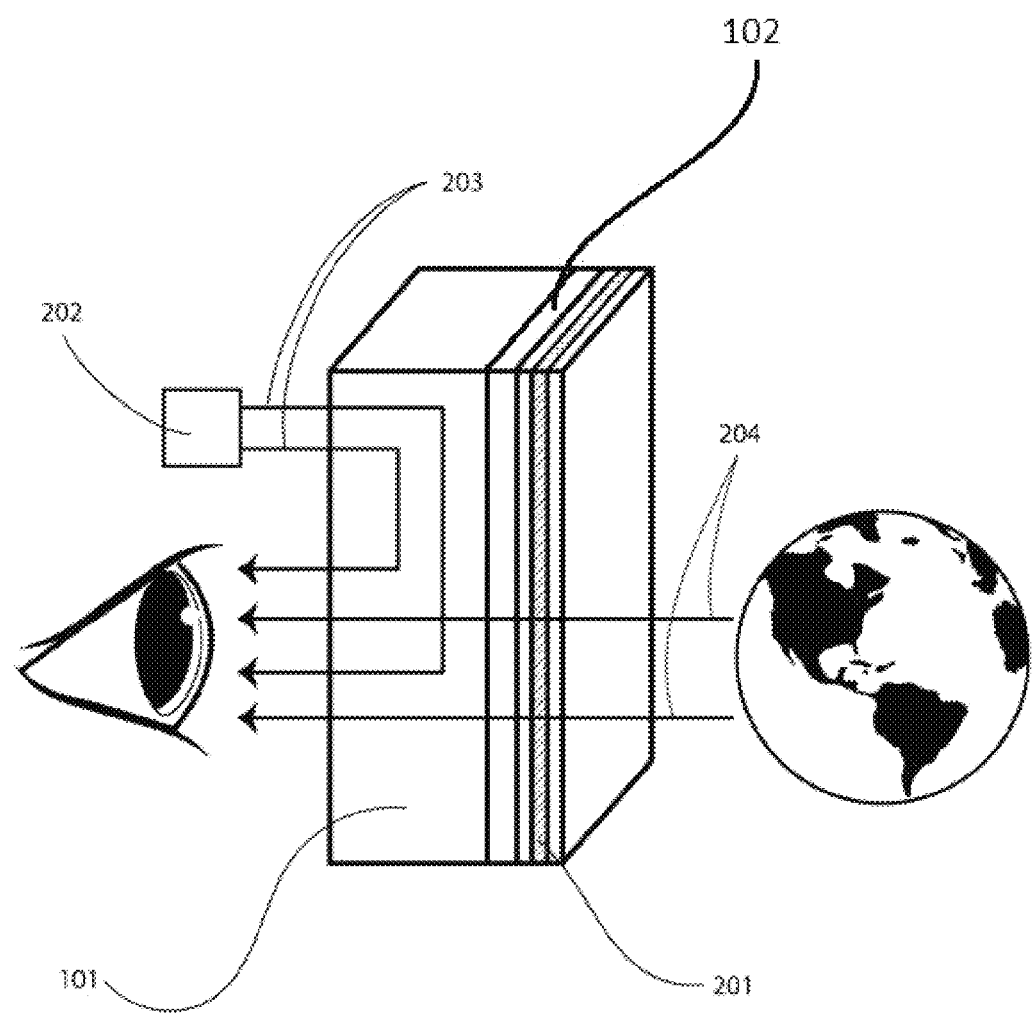
FIG. 4 shows a layered optical composite according to the present disclosure with back side coupling of an overlaid image.

FIG. 4 shows a layered optical composite according to the present disclosure with back side coupling of an overlaid image. The layered optical composite has a substrate 101 having a front face and a back face. On the front face of the substrate 101 is applied a t type layer 102 and a coating 201. A real world image 204 enters the layered optical composite through the front face, piercing the coating 201, the t type layer 102 and the substrate 101, to pass out of the back face. An overlaid image 203 is generated at a projector 202, positioned at the back of the layered optical composite, and passes through the layered optical composite transverse to the front face to then exit through the back face. The real world image 204 and the overlaid image 203 are both viewed by a viewer located behind the back face. In a variant, the t type layer and the coating 201 may be applied to the back face rather than the front face. In a variant, t type layers 102 and coatings 201 are applied to both the back face and the front face. Not shown are decoupling means on the back face, for example diffraction gratings. Where a coating is present on the back face, the decoupling means is preferably located between the substrate and the coating.

Figure 5:
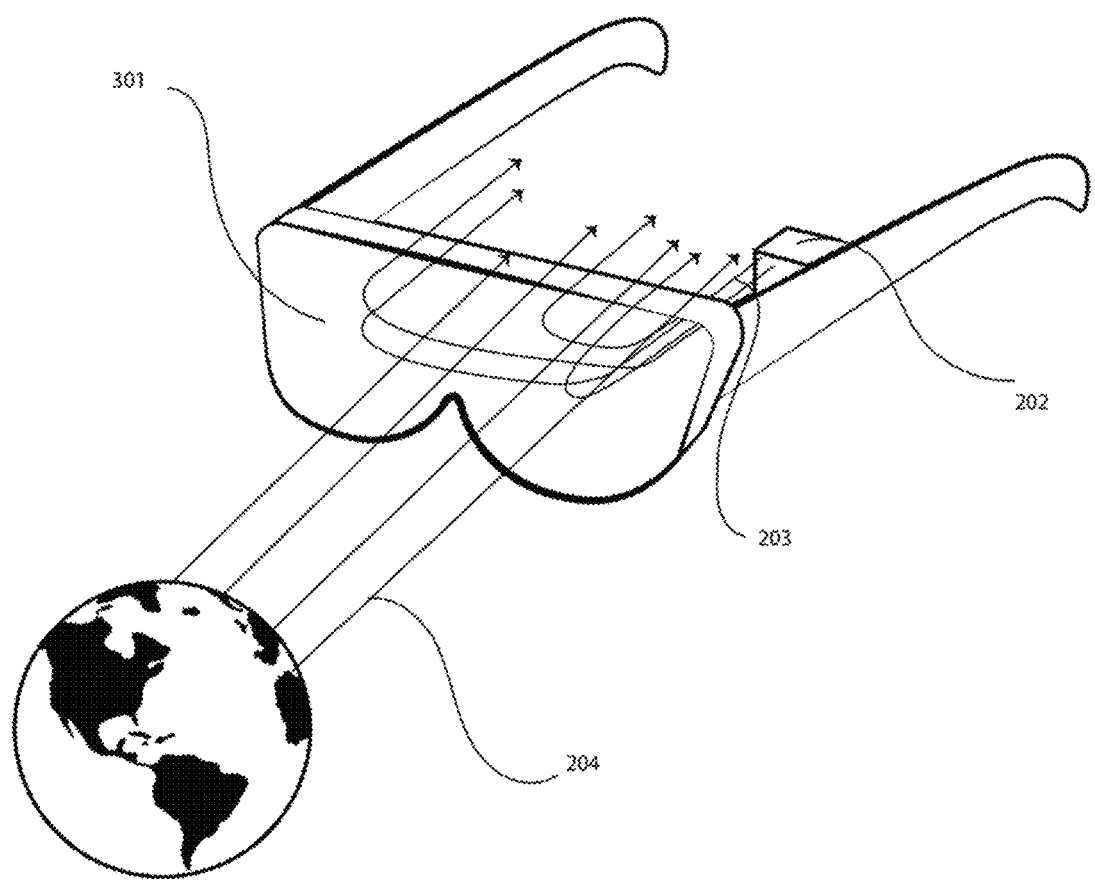
FIG. 5 shows an AR device according to the present disclosure.

FIG. 5 shows an AR device according to the present disclosure. A set of glasses/visor has a screen 301 comprising the layered optical composite of the disclosure. A real world image 204 penetrates the screen 301 from the front side to reach the back side. An overlaid image 203 is projected from a projector 202 located behind the screen 301. The overlaid image 203 propagates within the plane of the screen 301 and exits through its back face. Both the real world image 204 and the overlaid image 203 are received behind the back face.

Figure 6:
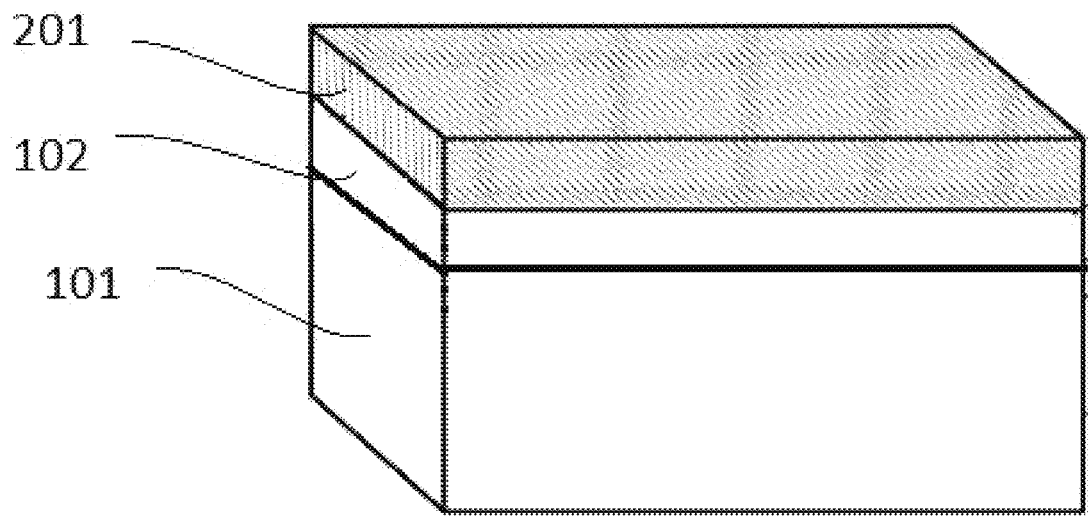
FIG. 6 shows a layered optical composite according to the present disclosure having a single c type layer.

FIG. 6 shows a layered optical composite according to the present disclosure having a t type layer 102 and a single c type layer 201. In the three variants, the t type layer 102 and the single c type layer 102 can be applied to the front face or to the back face, or one of each can be applied to each of the front face and the back face.

Figure 7:
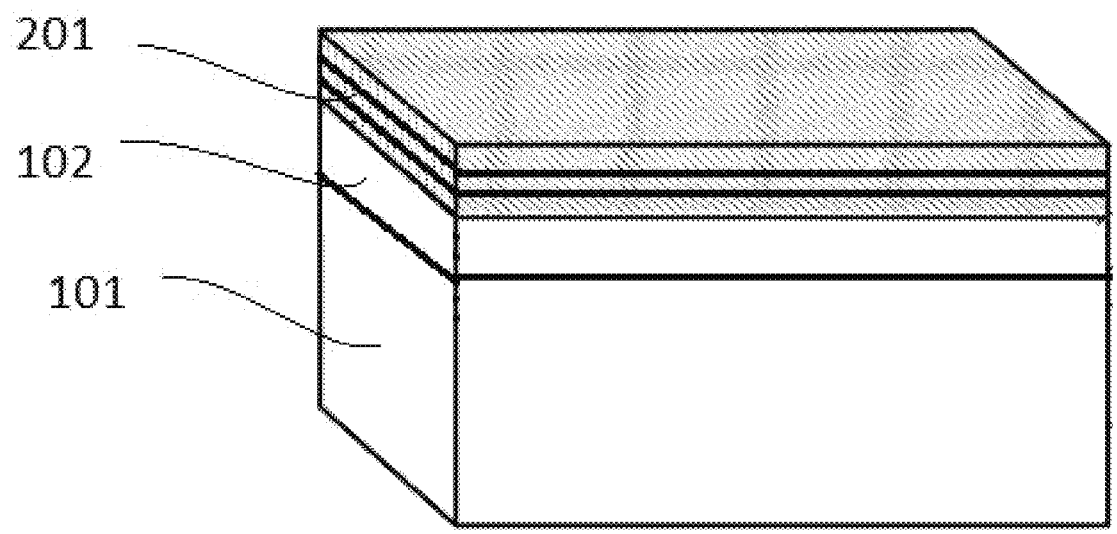
FIG. 7 shows a layered optical composite according to the present disclosure having 3 c type layers.

FIG. 7 shows a layered optical composite according to the present disclosure having a t type layer 102 and a coating 201 consisting of multiple c type layers. In the three variants, the t type layer 102 and the coating 102 can be applied to the front face or to the back face, or one of each can be applied to each of the front face and the back face.

Figure 8:
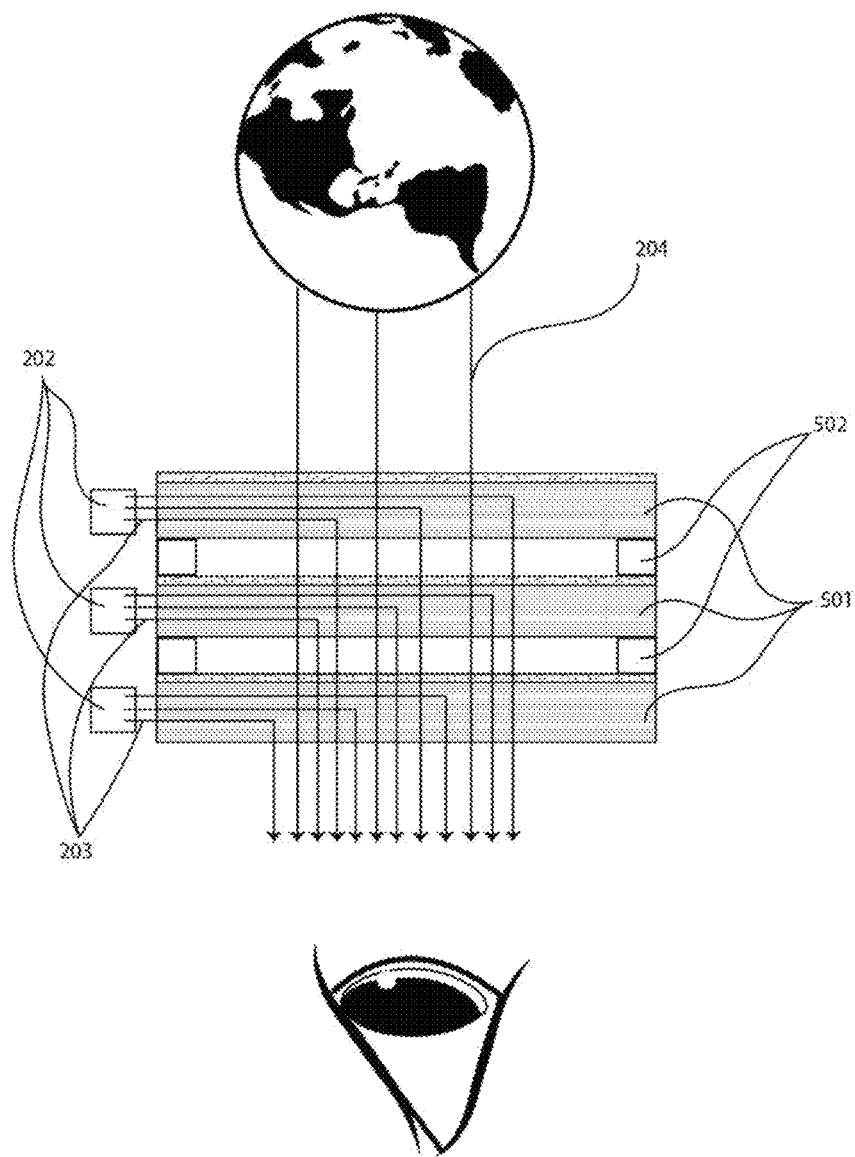
FIG. 8 shows a device comprising three layered optical composites according to the present disclosure arranged in a stack.

FIG. 8 shows a device comprising three layered optical composites according to the present disco closure arranged in a stack. The layered optical composites 501 are oriented parallel, overlapping as a stack, with their front faces in the same direction. The layered optical composites 501 are spaced by spacers 502 to leave an air gap betwixt. A real world image 204 penetrates through the layered optical composites sequentially exit through the back face of the last thereof. A separate projector 202 injects an overlaid image 203 into each of the layered optical composites. In each case, the overlaid image 203 exits the layered optical composite through the back face and combines with the real world image behind the back faces to give the augmented reality. In this case, the t type layer and the coating are shown on the front face. In variants, these could be applied to the back face or even to both the front face and the back face.

Figure 9:
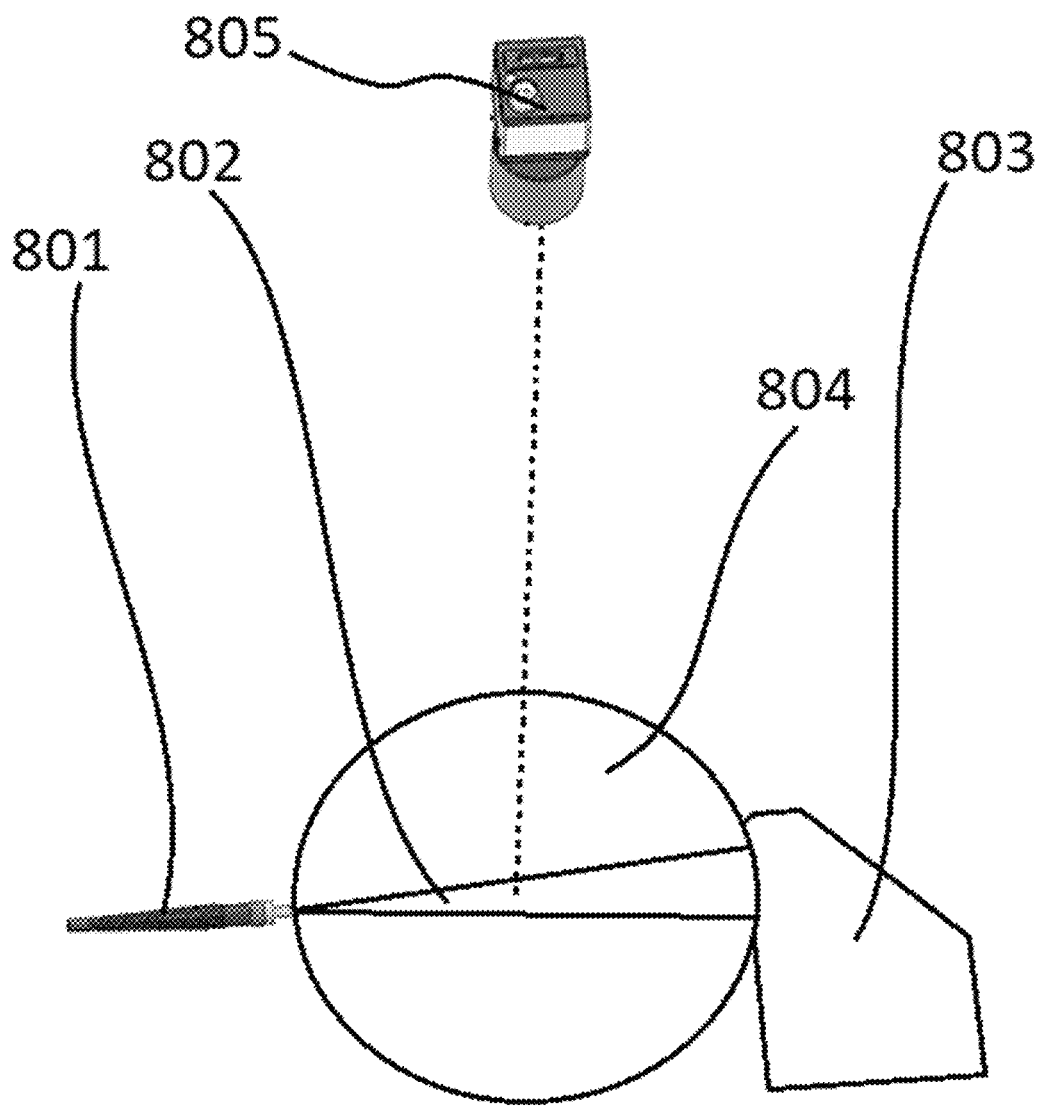
FIG. 9 shows an arrangement for determining in-plane optical loss of a target.

FIG. 9 shows an arrangement for determining in-plane optical loss of a target. The target 804 is of circular cross-section, having a diameter of 20 cm. Light is introduced into the target 804 from a light guiding FIG. 801 and follows a path 802 through the target 804. On the opposite side of the target 804 is located a light trap 803. Intensity of scattered light is measured using a camera located 50 cm above the geometric centre of the target.

Figure 10:
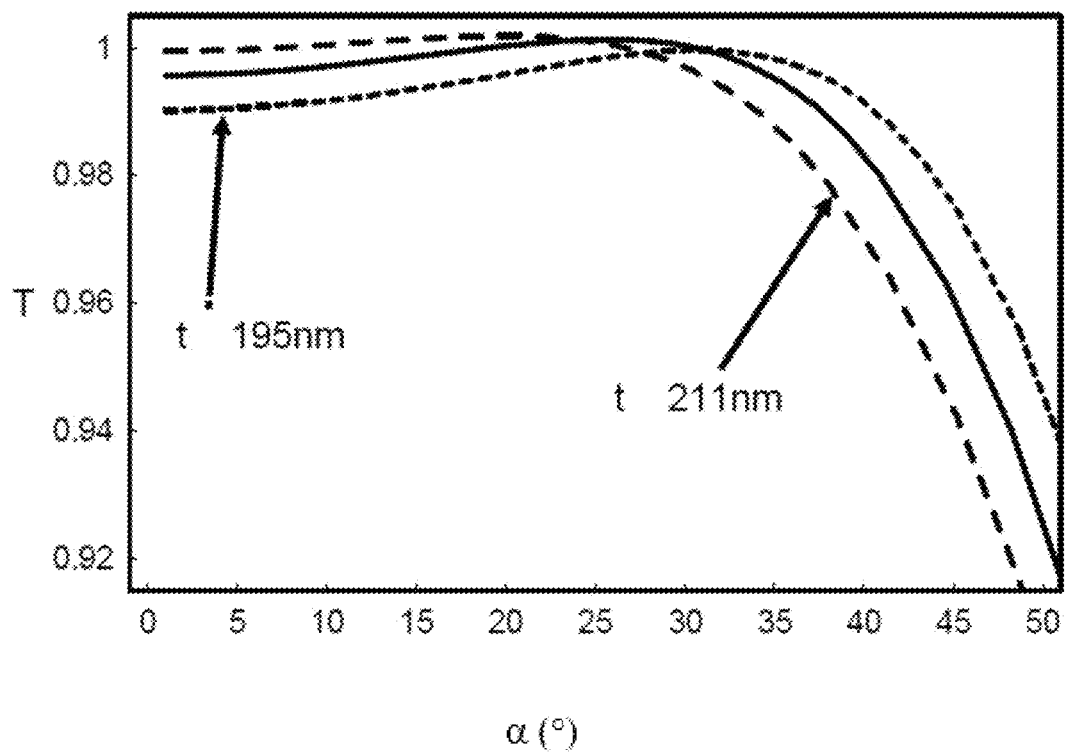
FIGS. 10 to 26 show reflectivity and transmissivity plots for the examples presented in tables 1 to 6 of the examples section.

FIG. 10 shows the transmissivity of the coating according to table 1 as a function of incident angle for a wavelength of 465 nm. The angle of incidence is the angle of impinging rays with respect to the normal of the front face. The solid curve is for the configuration according to table 1. The finely dashed line shows results for a reduction of thickness of the first layer to 195 nm. The coarse dashed line shows results for an increase of the thickness of the first layer to 211 nm. For a thickness of 203 nm for the first coating layer, transmissivity is above 98% up to an angle of incidence of 40°.

Figure 11:
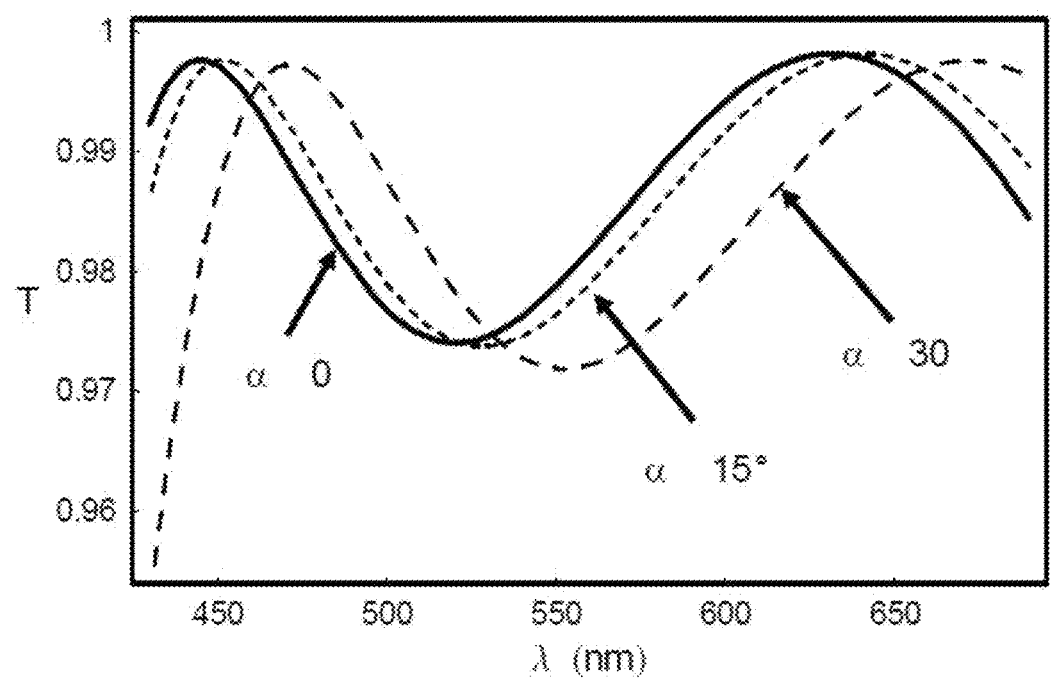

FIG. 11 shows the transmissivity of the coating according to table 1 (203 nm first layer) as a function of wavelength. The solid curve is for normal incidence ($\alpha=0°$), the finely and coarsely dashed curves are for incident angles of 15° and 30° respectively. The angle of incidence is the angle of impinging rays with respect to the normal of the front face. The transmissivity exceeds 97% for the entire visible spectral range at all three angles of incidence.

Figure 12:
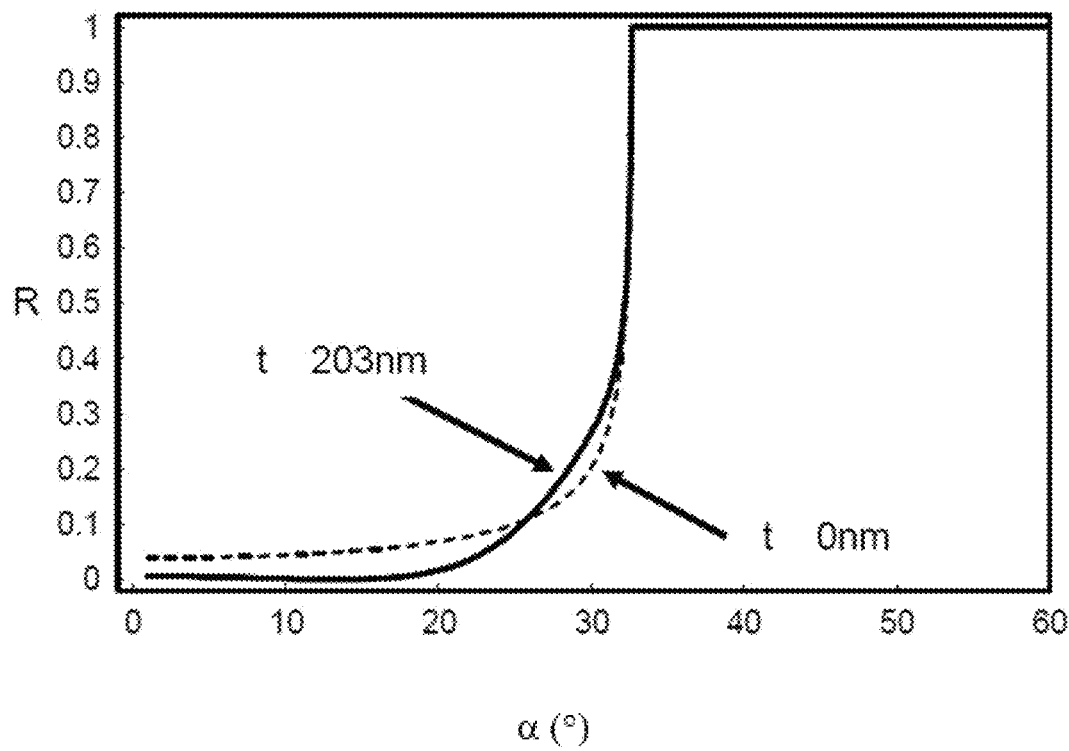

FIG. 12 shows reflectivity as a function of incident angle. The thick line is for the coating according to table 1 (203 nm first layer). The dashed line is for the same configuration but with the 203 nm first layer absent. The angle of reflection is the angle with respect to the normal of the reflecting face. The example according to table 1 presents a lower low-angle reflectivity.

Figure 13:
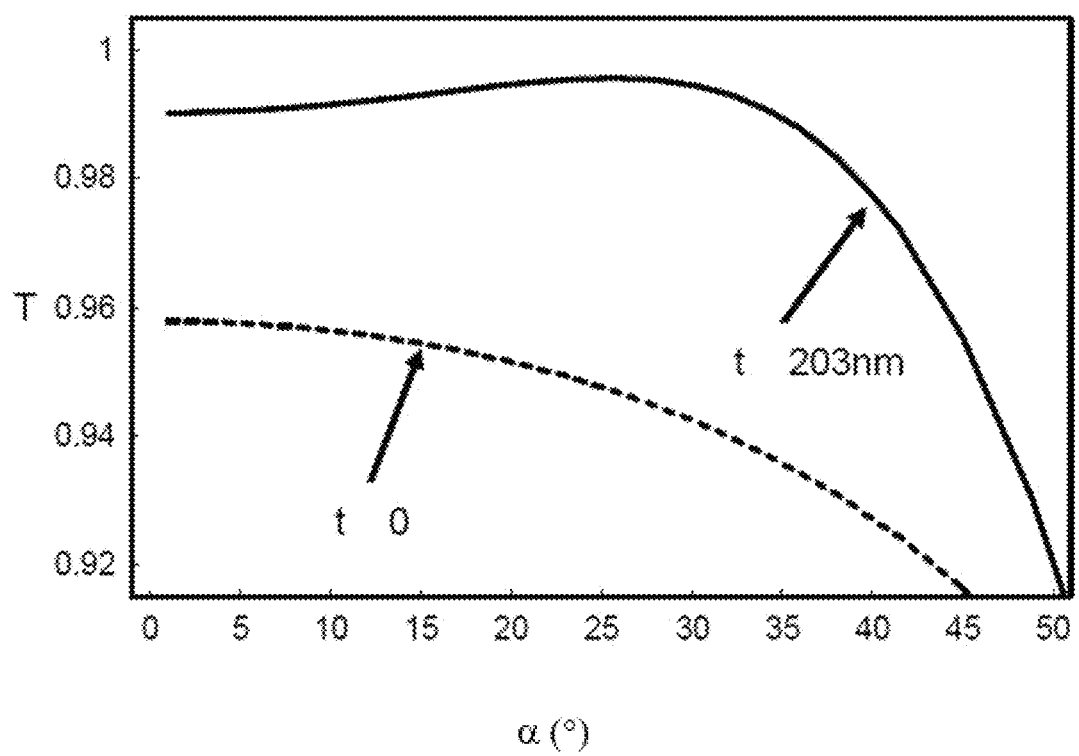

FIG. 13 shows the transmissivity for a wavelength of 465 nm as a function of angle of incidence. The angle of incidence is the angle of impinging rays with respect to the normal of the front face. The solid curve is for the coating of table 1 (203 nm first layer). The dashed line is for the same configuration but with the 203 nm first layer absent. The coating of table 1 produces a higher low-angle transmissivity (above 98% up to an angle of incidence of 40°).

Figure 14:
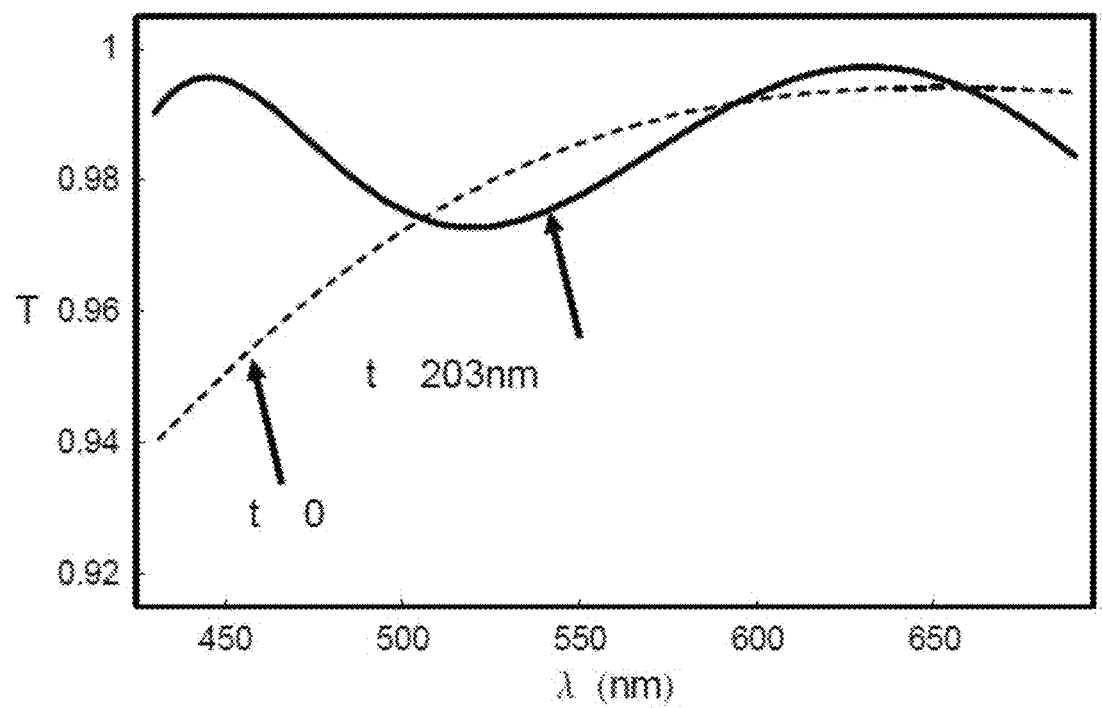

FIG. 14 shows transmissivity as a function of wavelength for normally incident light. The angle of incidence is the angle of impinging rays with respect to the normal of the front face. The solid curve is for the coating of table 1. The dashed line is for the same configuration but with the 203 nm first layer absent.

Figure 15:
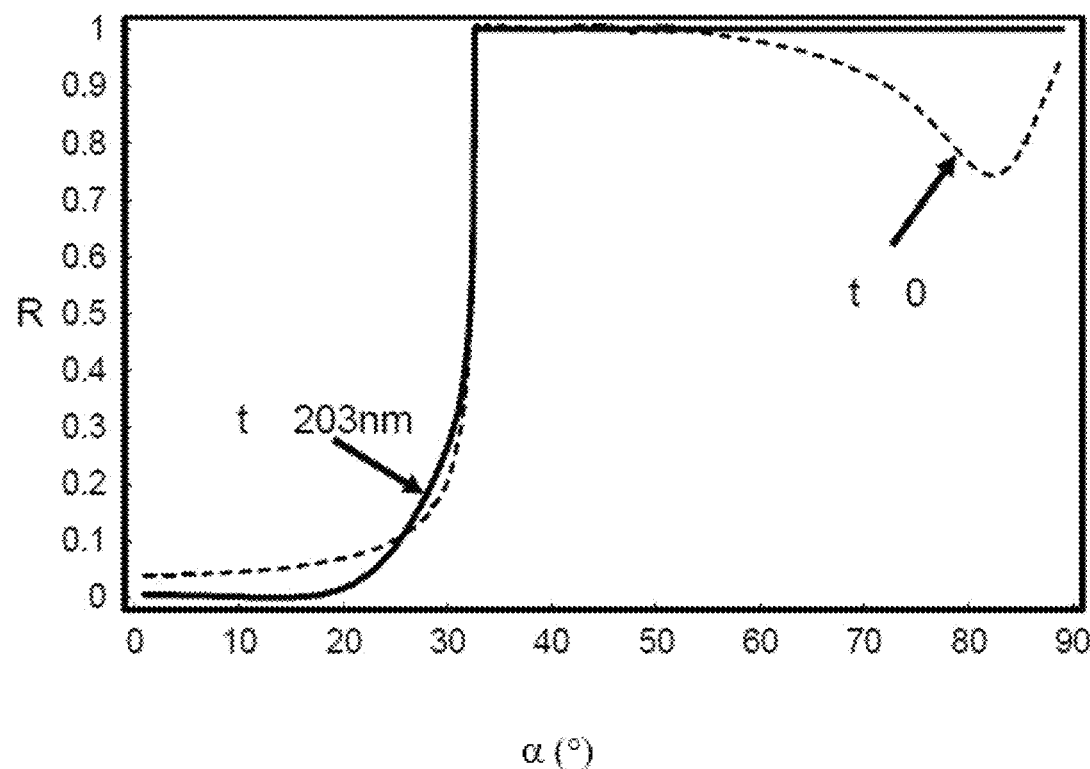

FIG. 15 shows the reflectivity as a function of angle of reflection. The angle of reflection is the angle with respect to the normal of the reflecting face. The solid curve is for the coating of table 1. The dashed line is for the same configuration but with the 203 nm first layer absent. The coating of table reduces low-angle reflectivity and maintains high high-angle reflectivity.

Figure 16:
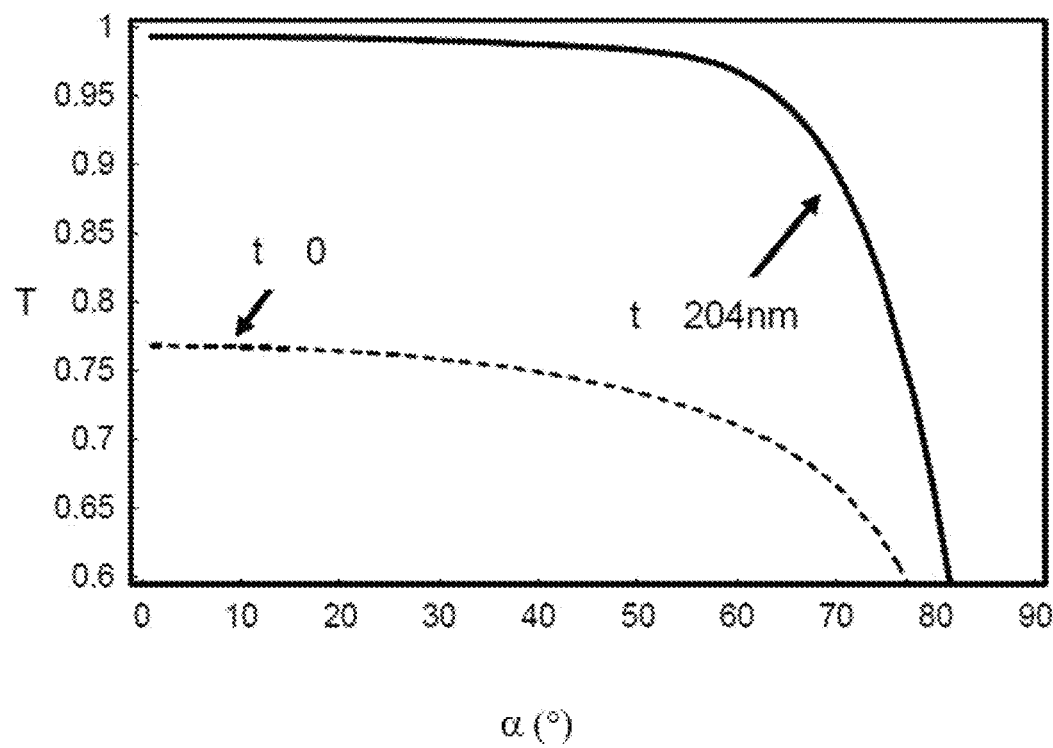

FIG. 16 shows transmissivity as a function of angle of incident at a wavelength of 650 nm. The angle of incidence is the angle of impinging rays with respect to the normal of the front face. The solid curve is for the coating of table 2 (204 nm first coating layer). The dashed line is for the same coating but with the 204 nm first layer absent. The coating of table 2 allows a greater transmissivity (transmissivity exceeds 98% up to an angle of incidence of 45°).

Figure 17:
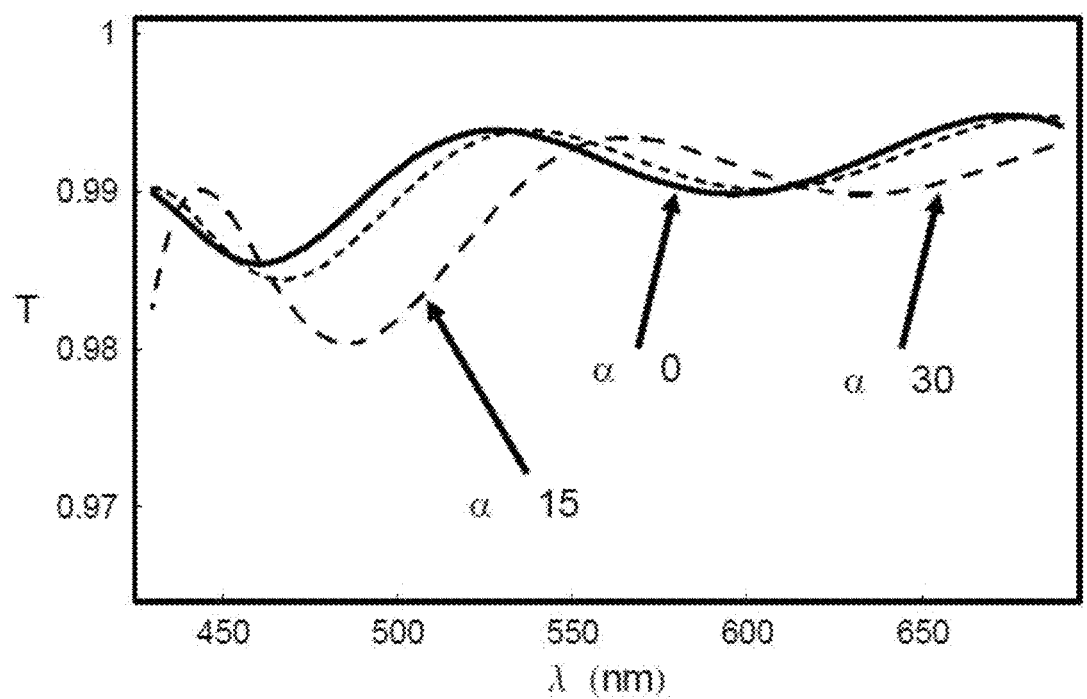

FIG. 17 shows transmissivity for the coating of table 2 as a function of wavelength. The solid curve is for normal incidence ($\alpha=0°$). The finely and coarsely dashed lines are for incident angles of 15° and 30° respectively. The transmissivity exceeds 98% for the total visible spectral range for each of the incident angles 1.

Figure 18:
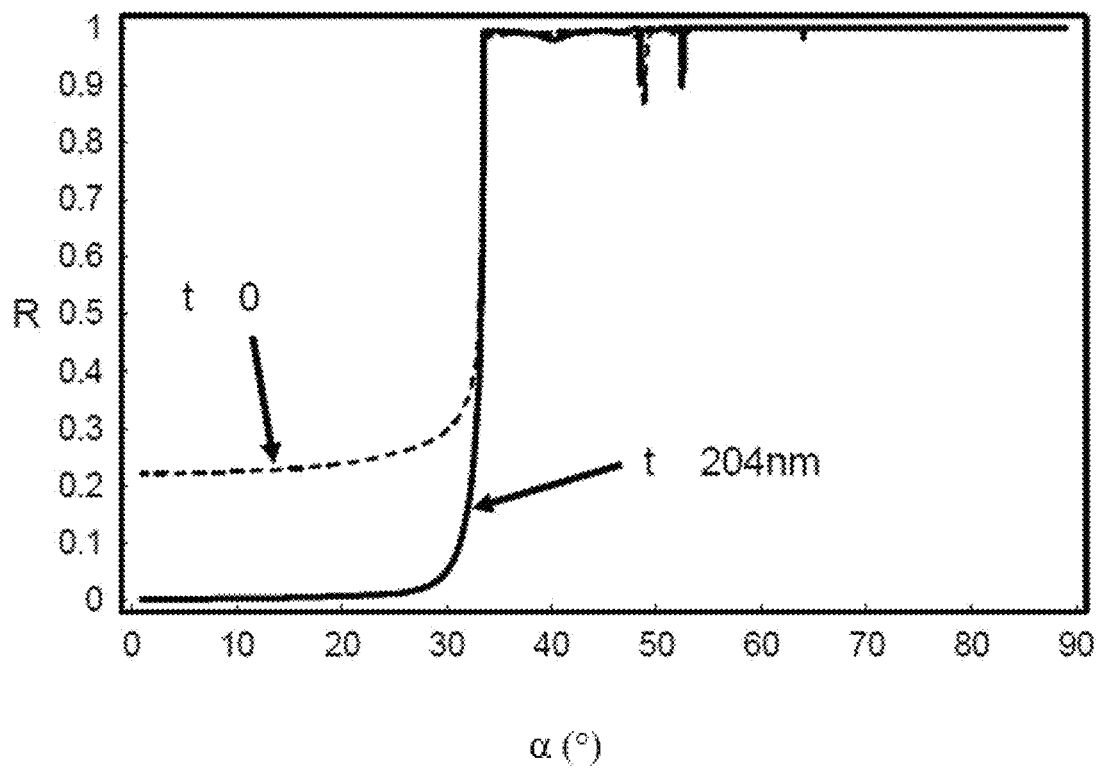

FIG. 18 shows the reflectivity as a function of angle of reflection. The solid curve is for the coating of table 2 (204 nm first coating layer). The dashed line is for the same coating but with the 204 nm first layer absent. The angle of reflection is the angle with respect to the normal of the reflecting face. The coating of table 2 allows a reduction of reflectivity for small incident angles and maintains a high for large angles.

Figure 19:
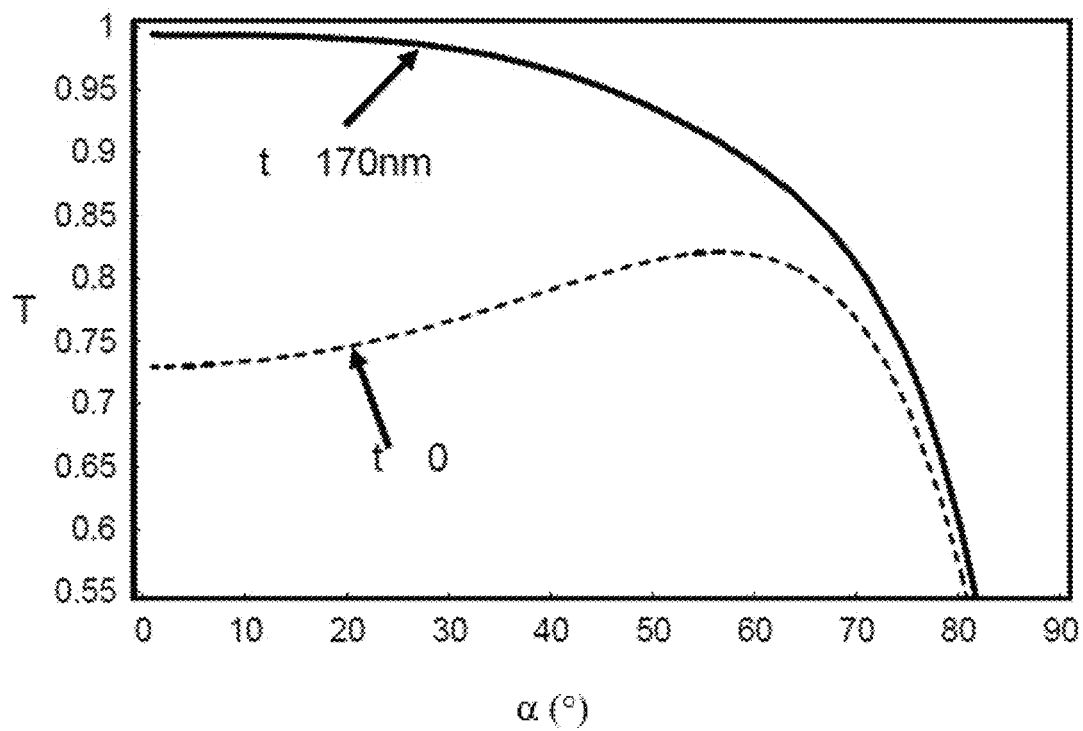

FIG. 19 shows transmissivity as a function of angle of incidence at a wavelength of 530 nm. The solid line is for the coating of table 3 (170 nm first coating layer) and the dashed line is for a configuration as per table 3, but with the 170 nm first layer absent. The transmissivity in the absence of the first coating layer is below 80% and exceeds 99% up to an angle of incidence of 45° where the first coating layer is present.

Figure 20:
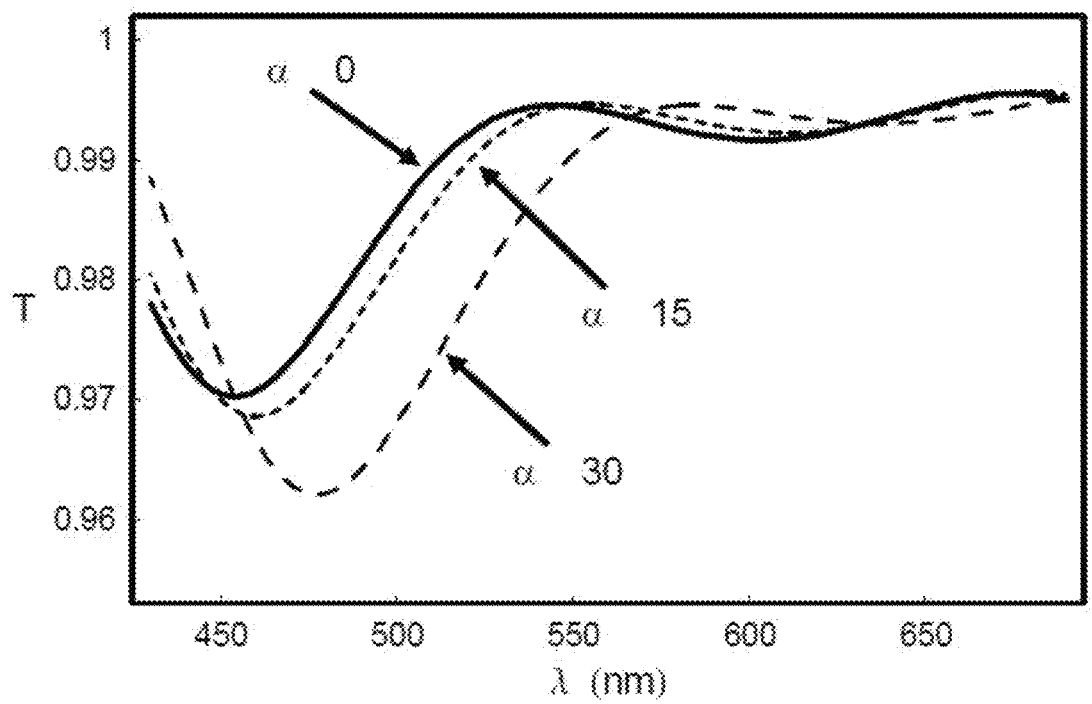

FIG. 20 shows transmissivity of the coating of table 3 as a function of wavelength. The solid curve is for normal incidence ($\alpha=0°$). The finely and coarsely dashed lines are for incident angles of 15° and 30° respectively. The transmissivity exceeds 98% for the total visible spectral range for each of the incident angles tested.

Figure 21:
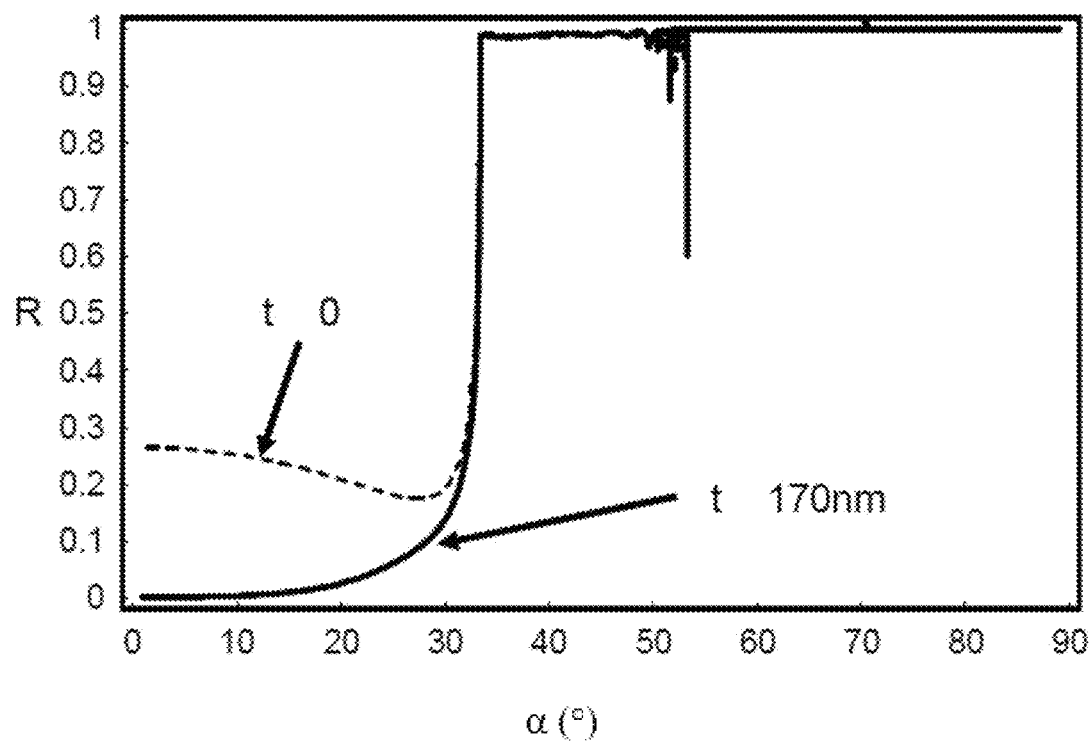

FIG. 21 shows reflectivity as a function of angle of incidence. The solid line is for the coating of table 3 (170 nm first coating layer) and the dashed line is for a configuration as per table 3, but with the 170 nm first layer absent. The presence of the first coating layer reduces the reflectivity for small incident angles.

Figure 22:
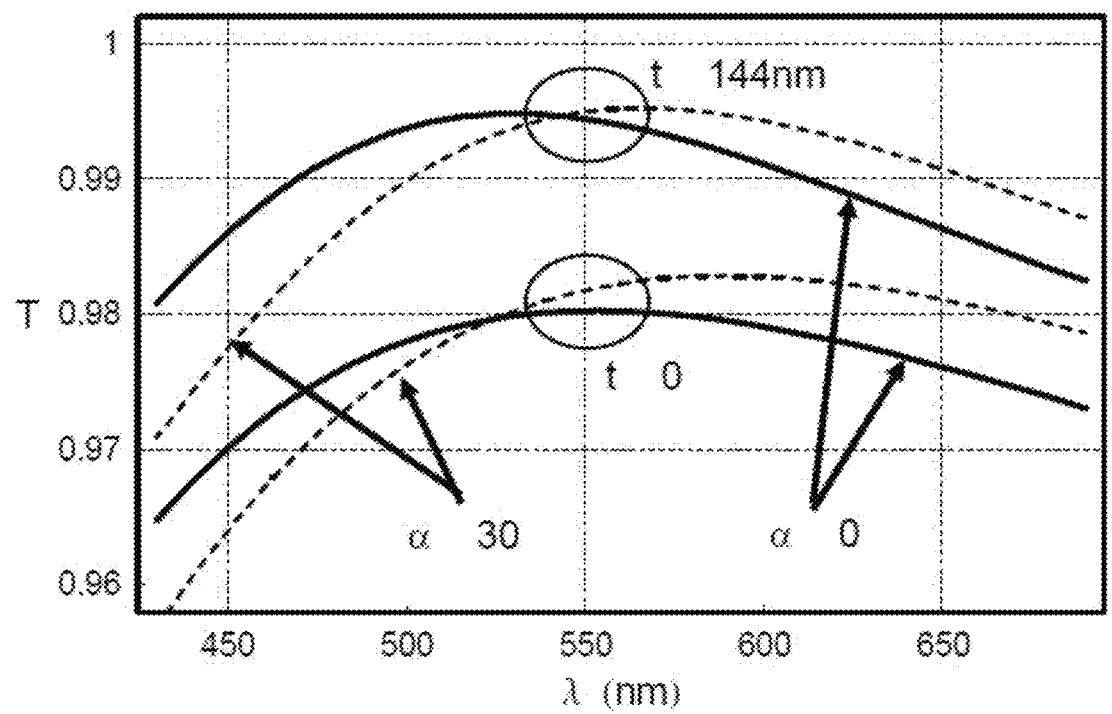

FIG. 22 shows transmissivity as a function of wavelength, both for the coating of table 4 (144 nm first coating layer) and for a coating according to table 4, but with the 144 nm first coating layer absent. In each case, the solid line is for normal incidence ($\alpha=0°$) and the dashed line is for oblique incidence $\alpha=30°$ on the front face. The presence of the first coating layer enhances the transmissivity by approximately 1%.

Figure 23:
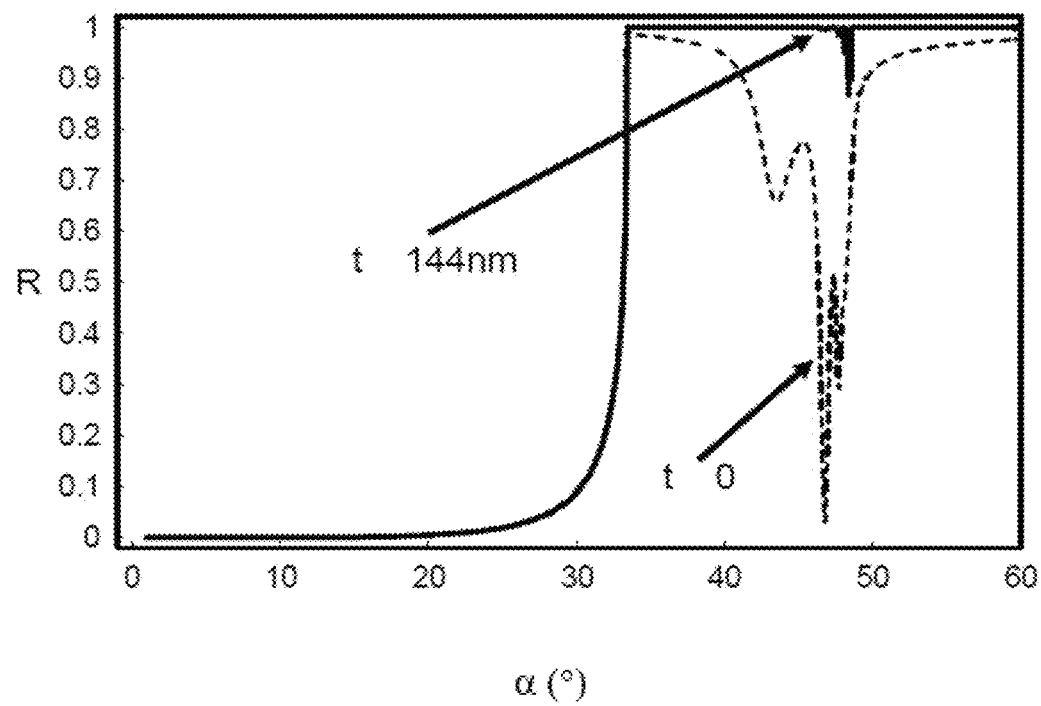

FIG. 23 shows reflectivity as a function of angle of reflection. The solid line is for the coating of table 4 (144 nm first coating layer) and the dashed line is for a configuration as per table 4, but with the 144 nm first layer absent. The angle of reflection is the angle with respect to the normal of the reflecting face. The presence of the 144 nm first coating layer ensures reflectivity is maintained at large angles.

Figure 24:
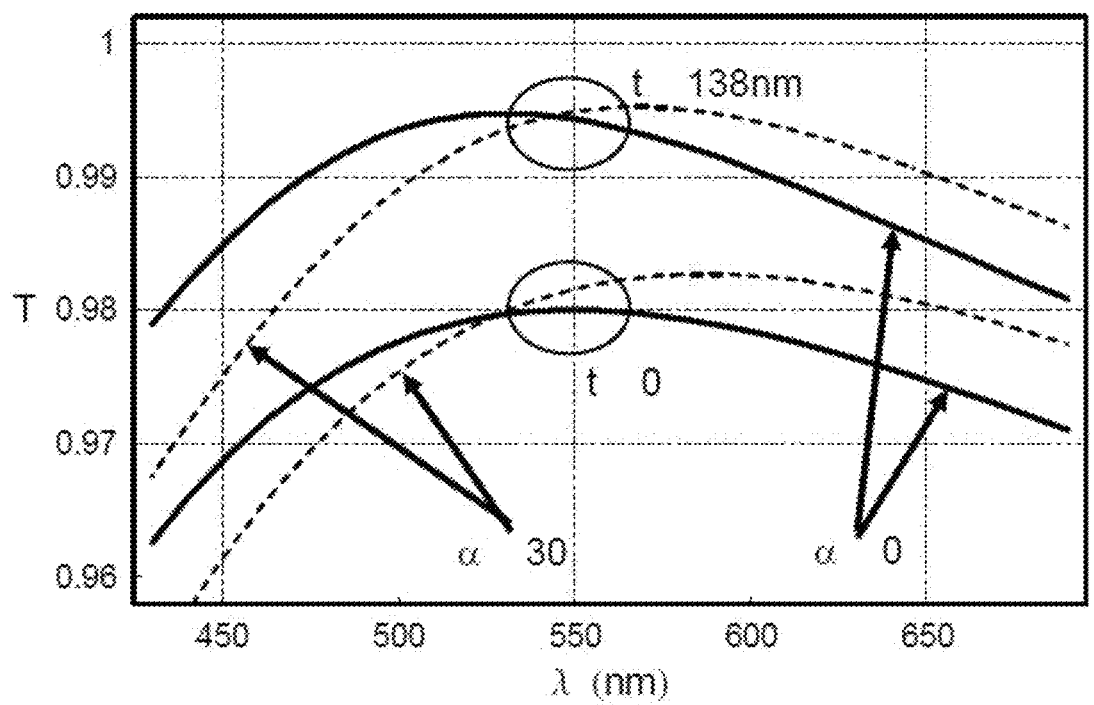

FIG. 24 shows transmissivity as a function of wavelength, both for the coating of table 4 (138 nm first coating layer) and for a coating according to table 4, but with the 138 nm first coating layer absent. In each case, the solid line is for normal incidence ($\alpha=0°$) and the dashed line is for oblique incidence $\alpha=30°$ on the front face. The transmissivity is enhanced by the presence of the 138 nm first coating layer by approximately 1.2%.

Figure 25:
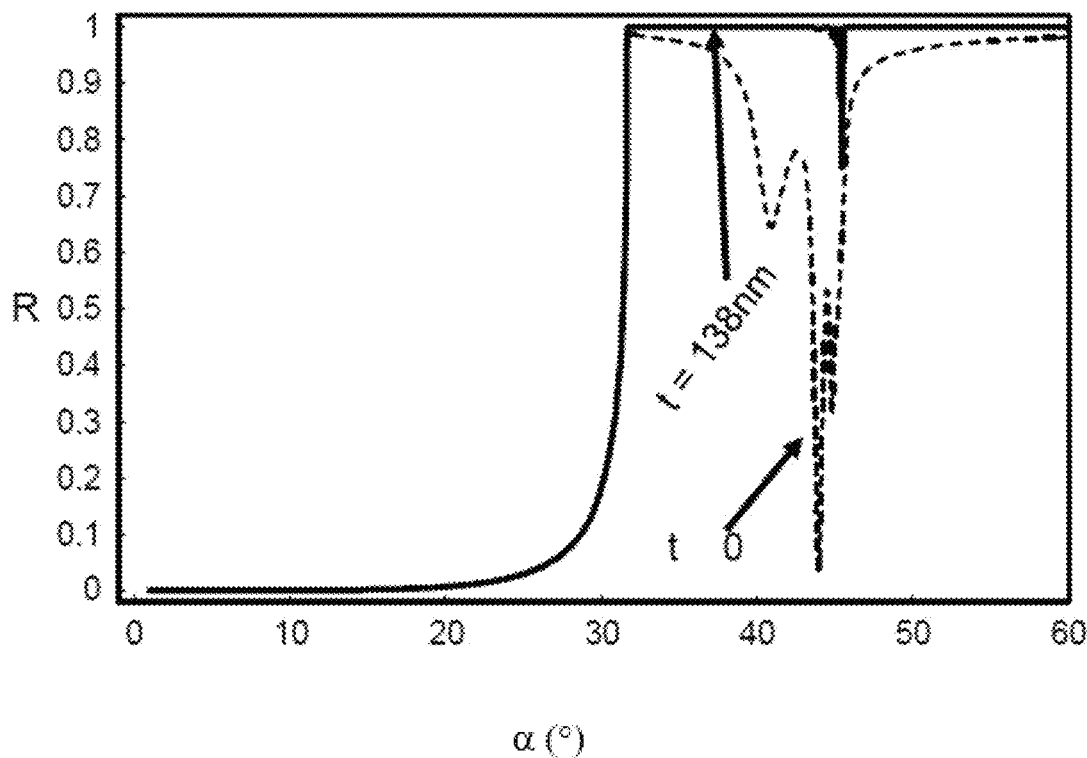

FIG. 25 shows the reflectivity as a function of angle of reflection. The solid line is for the coating of table 5 (138 nm first coating layer) and the dashed line is for a configuration as per table 5, but with the 138 nm first layer absent. The angle of reflection is the angle with respect to the normal of the reflecting face. The presence of the 138 nm first coating layer allows reflectivity to be maintained at large angles.

Figure 26:
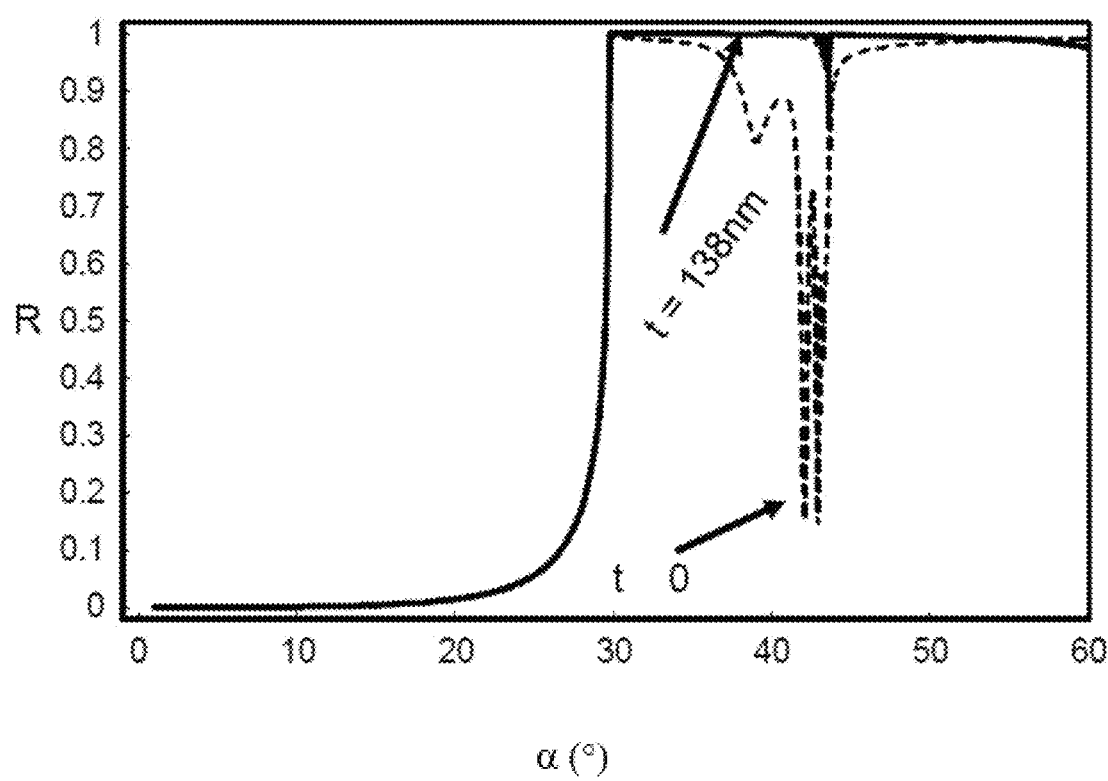

FIG. 26 shows reflectivity as a function of angle of reflection. The solid line is for the coating of table 6 (138 nm first coating layer) and the dashed line is for a configuration as per table 6, but with the 138 nm first layer absent. The angle of reflection is the angle with respect to the normal of the reflecting face. The presence of the 138 nm first coating layer allows reflectivity to be maintained at large angles.

Test Methods

Unless otherwise stated, all test methods are performed at a temperature of 25° C. and a pressure of 101,325 Pa. Unless otherwise stated, optical measurements are made using a 550 nm wavelength source.

Bow

Bow is measured according to ASTM F534-02

Warp

Warp is measured according to ASTM F657-92 (As reapproved in 1999)

In-Plane Optical Loss

The target substrate or layered optical composite is provided as a circular disk of diameter 15 cm. In the case of the layered optical composite, the front face (with the coating) is oriented upwards. A light guiding fibre having a numerical aperture of 0.15 is arranged to inject light into the target by polishing a 3 mm flat area at one side of the target and arranging the outlet face of the fibre parallel to and in physical contact with it. An immersion oil selected from the following list is deployed between the fibre and the target: Cargille Labs Series A ($1.460 \leq n \leq 1.640$), Cargille Labs Series B ($1.642 \leq n \leq 1.700$), Cargille Labs Series M ($1.705 \leq n \leq 1.800$), Cargille Labs Series H ($1.81 \leq n \leq 2.00$), Cargille Labs Series EH ($2.01 \leq n \leq 2.11$), Cargille Labs Series FH ($2.12 \leq n \leq 2.21$), Cargille Labs Series GH ($2.22 \leq n \leq 2.31$). The immersion oil having a refractive index closest to that of the target is selected. The light from the fibre is injected towards the geometric centre of the target and travels through the target to the opposite side. The spreading is determined by the numerical aperture of 0.15. A light trap is arranged at the opposite side to reduce reflection. A CCD (charge coupled device) camera is located 50 cm above the geometric centre of the target, directed towards the target. The camera takes a grey scale picture of the target. The intensity of scattered light is measured at 0.8 cm intervals along the line between the point of injection and the opposite side. Intensity of scattered light is fitted to an exponential decay curve, normalised and the value at the opposite side extrapolated to give the in-plane optical loss. Unless otherwise stated, in-plane optical loss is measured using a 450 nm wavelength light source.

The apparatus is calibrated by measuring photo current using an integrating sphere at the target's centre. The image processing algorithm generates a circular region of the same size and position as the sphere's input port. The grey scale signal within this region is cumulated in order to calibrate the camera's grey scale signal to the radiometric world.

Layer Thickness and Chemical Composition

Layer thickness and chemical composition of a layered optical composite is determined using a combination of time of flight secondary ion spectroscopy (ToF-SIMS) to determine the layer arrangement and reflectometry to determine layer thicknesses. The surface is first cleaned using isopropanol and de-ionized water. Following the cleaning, clean conditions are used to avoid contamination of the sample. The ToF-SIMS measurement is conducted on the cleaned sample. ToF-SIMS depth profiles were performed using a TOF-SIMS IV-100 obtainable from ION-TOF GmbH equipped with 25 keV Ga+ primary ions. Positively and negatively charged ions were analyzed in 2 consecutive analysis steps. The analysis of the positively charged ions was performed on an area of $50 \times 50$ µm$^2$ with a primary ion current of 2.0 pA. The sputter treatment was performed in alternating mode by an $O_2$ sputter ion gun for positive ion detection on an area of $300 \times 300$ µm$^2$ with an energy of 1.0 keV and a sputter current of 350 nA. For charge compensation, an electron flood gun was used. The analysis of the negatively charged ions was performed on an area of 50×50 µm² with a primary ion current of 1.0 pA. The sputter treatment was performed in alternating mode by a Cs+ sputter ion gun for negative ion detection on an area of 300×300 µm² with an energy of 0.5 keV and a sputter current of 40 nA. For charge compensation an electron flood gun was used. For data processing the software SurfaceLab 6.7 was used. An example plot in the case of 4 layer $SiO_2/TiO_2$ system is shown in FIG. 11.

Once the layer identities and ordering has been determined using ToF-SIMS, layer thicknesses are determined using surface reflectance. First, the uncoated back face surface of the sample is roughened using sand paper to get a milky appearance on the back face to avoid specular back face reflectance. A black permanent marker of the type "Edding 8750" is then used to blacken the back face. The reflectance measurement is performed using the reflectometer Lambda900 from Perkin Elmer. The tool measures the specular reflectance versus the wavelength. A spectrum is measured over the range 400 to 700 nm. A set of thickness and refractive index values for the individual layers is fit to the measured reflective curve using the TFCalc optic design software.

Refractive Index

The refractive index of coating layers is measured by ellipsometry. First, the uncoated back face surface of the sample is roughened using sand paper to get a milky appearance on the back face to avoid specular back face reflectance. A black permanent marker of the type "Edding 8750" is then used to blacken the back face. The measurement is performed with a Woollam M-2000 under several angle of incidences: 60°, 65°, and 70°. Modelling the layers of $SiO_2$ was done by using the dispersion model after "Sellmeier", modelling the layers of $TiO_2$ was done using the dispersion model after "Cody-Lorentz". Substrate data was taken from the database.

Roughness

Surface roughness is measured using an atomic force microscope, model DI nanoscope D3100-S1 from Digital Instruments. An area of the sample of 2 µm by 2 µm is scanned in tapping mode, scanning the area with 256 lines per picture and 256 dots per line. The scan rate is 0.7 Hz. The cantilever has a tip with a tip radius of ≤10 nm. The sample's topography is measured by evaluating the change of the amplitude of the oscillating cantilever when scanning the surface. The raw data is levelled by a line fit, using a $3^{rd}$ order polynomial fit. The root mean squared roughness Res is calculated by the AFM's software using the formula $$R_{rms} = \sqrt{\frac{1}{n}\sum_{i=1}^{n} y_i^2}$$

where n=256*256=65536 and)), is the height value at each of the 65536 measured positions.

Examples

The present disclosure is now exemplified by means of non-limiting examples.

A layered optical composites having layer arrangements as per tables 1 to 6 were prepared as follows: Firstly, a circular 150 mm diameter wafer of the substrate material was provided (materials N-SF6 and N-SF66 are commercially available from Schott AG). A front face of the wafer was cleaned in a bath of de-ionised water at 40° C. with ultrasound at 130 kHz for 200 seconds. The wafer was then dried with air at 60° C. for 500 seconds. A surface almost entirely devoid of impurity particles thereon was obtained. The wafer was mounted on the evaporation dome in the vacuum chamber of a Leybold APS 1104 and the evaporation machine was charged with the appropriate coating materials. The pressure of the evacuation chamber was lowered to $1×10^{-3}$ Pa. Layers according to tables 1 to 6 where deposited at a rate of 2.5 Å/s with an ion energy 60 eV. Refractive indices, thicknesses and absorption coefficients for the layers are given in tables 1 to 6.

TABLE 1

| Material | N-SF6 | $SiO_2$ | AlSiN | $SiO_2$ |
|---|---|---|---|---|
| n@465 nm | 1.855 | 1.464 | 1.921 | 1.464 |
| K@465 nm [cm⁻¹] | $2 \cdot 10^{-2}$ | 0.1 | 500 | 0.1 |
| t [nm] | 350,000 | 203 | 25 | 115 |

TABLE 2

| Material | N-SF6 | $SiO_2$ | $TiO_2$ | $SiO_2$ | $TiO_2$ | $SiO_2$ |
|---|---|---|---|---|---|---|
| n@650 | 1.81 | 1.45 | 2.423 | 1.45 | 2.423 | 1.45 |
| K@650 nm [cm⁻¹] | 0.01 | 0.5 | 500 | 0.5 | 500 | 0.5 |
| t [nm] | 380,000 | 204 | 26 | 30 | 38 | 98 |

TABLE 3

| Material | N-SF6 | $SiO_2$ | $TiO_2$ | SiO2 | $TiO_2$ | $SiO_2$ |
|---|---|---|---|---|---|---|
| n@530 | 1.815 | 1.456 | 2.2357 | 1.452 | 2.2357 | 1.452 |
| K@530 nm [cm⁻¹] | 0.1 | 0.5 | 500 | 0.5 | 500 | 0.5 |
| t [nm] | 400,000 | 170 | 10 | 18 | 101 | 89 |

TABLE 4

| Material | N-SF6 | $Al_2O_3$ | $Al_2F_3$ |
|---|---|---|---|
| n@530 nm | 1.815 | 1.772 | 1.361 |
| K@530 nm [cm⁻¹] | 0.1 | 1 | 500 |
| t [nm] | 400,000 | 144 | 97 |

TABLE 5

| Material | N-SF66 | $Al_2O_3/Pr_6O_{11}$ | $Al_2F_3$ |
|---|---|---|---|
| n@530 nm | 1.905 | 1.855 | 1.361 |
| K@530 nm [cm⁻¹] | 1 | 1 | 500 |
| t [nm] | 400,000 | 138 | 97 |

TABLE 6

| Material | N-SFX | HfO$_2$ | LiF |
|---|---|---|---|
| n@530 nm | 2.015 | 1.949 | 1.391 |
| K@530 nm [cm$^{-1}$] | 0.05 | 10 | 500 |
| t [nm] | 410,000 | 138 | 97 |

Transmissivity and reflectivity data are shown in FIGS. 10 to 26 for the layer configurations presented in tables 1 to 6, as well as for comparative examples, in which the first coating layer either has an altered thickness or is omitted. In those figures, the T-type layer according to the disclosure improves low angle transmissivity, as well as to maintaining large angle reflectivity.

REFERENCE LIST

100 Layered optical composite
101 Substrate
102 T type layer
103 First coating layer
104 Second coating layer
105 Third coating layer
106 Backwards direction
107 Forwards direction
201 Coating
202 Projector
203 Overlaid image
204 Real world image
301 Screen
501 Layered optical composite
502 Spacer
601 Width
602 Length
603 Thickness
604 Front face
605 Back face
801 Light guiding fibre
802 Light path
803 Light trap
804 Target
805 Camera

The invention claimed is:
1. A layered optical composite comprising:
a. a substrate having a front face and a back face; and
b. a coating comprising:
  i. a type T layer, and
  ii. a type C region comprising one or more type C layers;
wherein the substrate has:
  i. a thickness $t_G$ in the range from 0.2 to 1.2 mm,
  ii. a refractive index $n_G$ at a wavelength $\lambda$ in the range from 1.6 to 2.4, and
  iii. an optical absorption coefficient $K_G$ at the wavelength $\lambda$ of less than 10 cm$^{-1}$;
wherein the type C layers individually and independently have:
  i. a thickness $t_C$ in the range from 9 to 250 nm,
  ii. a refractive index $n_C$ at the wavelength $\lambda$ in the range from 1.35 to 2.43, and
  iii. an optical absorption coefficient $K_C$ at the wavelength $\lambda$ of less than 10$^6$ cm$^{-1}$;
wherein at least one type C layer has:
  i. an optical absorption coefficient at the wavelength $\lambda$ of at least 100 cm$^{-1}$;
wherein the type T layer has:
  i. a thickness $t_T$ in the range from 50 to 300 nm,
  ii. a refractive index $n_T$ at the wavelength $\lambda$ in the range from 1.35 to 1.96, and
  iii. an optical absorption coefficient $K_T$ of less than 80 cm$^{-1}$;
wherein the type C region and the type T layer are each superimposed over one face of the substrate with the type C region further than the type T layer from the substrate;
wherein $\lambda$ is in the range from 430 to 670 nm.

2. The layered optical composite according to claim 1, wherein the thickness of the type T layer $t_T$ layer satisfies one or both of the following criteria:
a.
$$t_T \geq 0.35 \frac{\lambda}{n_T};$$
and
b.
$$t_T \leq 0.65 \cdot \frac{\lambda}{n_T}.$$

3. The layered optical composite according to claim 1, wherein the refractive index of the type T layer $n_T$ is less than the refractive of the substrate $n_G$.

4. The layered optical composite according to claim 1, wherein the C-type region has two or more type C layers.

5. The layered optical composite according to claim 4, wherein one or both of the following criteria are satisfied:
a. $n_t \geq (n_G - 0.03)/1.4$; and
b. $n_t \leq (n_G + 0.39)/1.4$.

6. The layered optical composite according to claim 4, wherein the layered optical composite has an optical transmissivity at the wavelength $\lambda$ of at least 90% for light incident normal to its front face.

7. The layered optical composite according to claim 1, wherein the coating has a single type C layer.

8. The layered optical composite according to claim 7, wherein the type C layer has a refractive index $n_C$ and one or more of the following criteria are satisfied:
a. $n_C < n_T$;
b. $n_T \geq n_G - 0.11$; and
c. $n_T \leq n_G - 0.03$.

9. The layered optical composite according to claim 7, wherein one or both of the following criteria are satisfied:
a. $|\sqrt{n_T n_E} - n_C| \leq 0.11$; and
b.
$$\left| \frac{\lambda}{4 n_C} - t_C \right| \leq \frac{\lambda}{50}.$$

10. The layered optical composite according to claim 1, wherein one or more of the following is satisfied:
i.) A radius of curvature of the substrate is greater than 600 mm;
ii.) An in-plane optical loss of the substrate measured perpendicular to the front face is at most 20%;
iii.) A surface roughness of the substrate is less than 5 nm;
iv.) A surface roughness of the coating is less than 5 nm;

v.) A total thickness variation of the substrate is less than 5 µm;

vi.) A min-max local thickness variation over 75% of the front face is less than 5 µm;

vii.) A warp of the optical layered composite is less than 350 µm;

viii.) A bow of the optical layered composite is less than 300 µm.

11. The layered optical composite according to claim 1, wherein the substrate is selected from glass, polymer, opto-ceramics, and crystals.

12. The layered optical composite according to claim 1, further comprising a coupler for coupling light into or decoupling light out of the layered optical composite.

13. The layered optical composite according to claim 1, wherein the layered optical composite is a wafer.

14. The layered optical composite according to claim 13, wherein one or more, or all, of the following criteria is satisfied:

i.) The front face has a surface area in the range from 1 to 400 cm$^2$;

ii.) The thickness of the substrate $t_G$ is in the range from 50 to 1500 µm;

iii.) A radius of curvature of the substrate is greater than 600 mm;

iv.) An in-plane optical loss measured perpendicular to the front face is at most 20%;

v.) A surface roughness of the substrate is less than 5 nm;

vi.) A surface roughness of the coating is less than 5 nm;

vii.) A total thickness variation of the substrate is less than 5 µm;

viii.) A maximum local thickness variation over 75% of the front face is less than 5 µm;

ix.) A warp of the optical layered composite is less than 350 µm;

x.) A bow of the optical layered composite is less than 300 µm;

xi.) The composite has a circular or square shape.

15. The optical layered composite according to claim 1, wherein one or more of the following is satisfied:

a. The thickness of the optical layered composite is in the range in the range from 250 to 700 µm;

b. The thickness $t_T$ of the T-type layer exceeds 60% of the total thickness $t_C$ of the grouping of C-type layers;

c. The thickness $t_C$ of the coating is less than 0.6% of the thickness $t_G$ of substrate;

d. The radius of curvature of the substrate is greater than 1100 mm;
the radius of curvature of the layered composite is greater than 800 mm;

e. The maximum local thickness variation of the substrate over 75% of the front face of less than 2 µm; and
the warp of the optical layered composite is less than 250 µm; and
the bow of the optical layered composite is less than 300 µm;

f. The surface roughness of the substrate is less than 3 nm; and
the surface roughness of the type-C-coating is less than 2 nm; and
the surface roughness of the type-T-coating is less than 4 nm;

g. The transmittance measured perpendicular to the front face is at least 85%.

16. A device comprising one or more layered optical composites according to claim 1.

17. A process for making an augmented reality device comprising the following steps:

i.) Providing a wafer according to claim 13;

ii.) Reducing the surface area of the front face to obtain a portion;

iii.) Providing the portion as a viewing window in the augmented reality device.

18. An augmented reality device or virtual reality device comprising the layered optical composite according to claim 1.

* * * * *